United States Patent
Dodge et al.

(10) Patent No.: US 12,437,080 B2
(45) Date of Patent: Oct. 7, 2025

(54) AUTOMATED PACKETLESS NETWORK REACHABILITY ANALYSIS

(71) Applicant: Amazon Technologies, Inc., Seattle, WA (US)

(72) Inventors: Catherine Dodge, Seattle, WA (US); Nikhil Reddy Cheruku, Falls Church, VA (US); John Byron Cook, Brooklyn, NY (US); Temesghen Kahsai Azene, Union City, CA (US); William Jo Kocik, Charles Town, WV (US); Sean Mclaughlin, Seattle, WA (US); Mark Edward Stalzer, Arlington, VA (US); Blake Whaley, Fairfax, VA (US); Yiwen Wu, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 18/306,947

(22) Filed: Apr. 25, 2023

(65) Prior Publication Data
US 2023/0262087 A1 Aug. 17, 2023

Related U.S. Application Data

(63) Continuation of application No. 17/459,908, filed on Aug. 27, 2021, now Pat. No. 11,671,442, which is a (Continued)

(51) Int. Cl.
*G06F 21/57* (2013.01)
*H04L 9/40* (2022.01)
(Continued)

(52) U.S. Cl.
CPC ........ *G06F 21/577* (2013.01); *H04L 41/0866* (2013.01); *H04L 43/06* (2013.01); (Continued)

(58) Field of Classification Search
CPC ... G06F 21/577; H04L 41/0866; H04L 43/06; H04L 63/0272; H04L 63/1433; H04L 63/1441
See application file for complete search history.

(56) References Cited

U.S. PATENT DOCUMENTS

| | | | |
|---|---|---|---|
| 5,892,903 A * | 4/1999 | Klaus | G06F 21/577 709/227 |
| 7,003,562 B2 | 2/2006 | Mayer | |

(Continued)

FOREIGN PATENT DOCUMENTS

| | | |
|---|---|---|
| CN | 101067823 A | 11/2007 |
| CN | 101699801 | 4/2010 |

(Continued)

OTHER PUBLICATIONS

Marcelo Santos, et al., "An Adaptive Random Heuristic in Virtual Networks: Dependability Analysis", 2015 Latin American Network Operations and Management Symposium (LANOMS), Oct. 3, 2015, IEEE.

(Continued)

*Primary Examiner* — Chau Le
(74) *Attorney, Agent, or Firm* — Robert C. Kowert; Kowert, Hood, Munyon, Rankin & Goetzel, P.C.

(57) ABSTRACT

Methods, systems, and computer-readable media for automated packetless network reachability analysis are disclosed. An analysis is performed of network configuration data for a network comprising a host computer. Based at least in part on the analysis, one or more ports at the host computer that are reachable from another computer are determined. Based at least in part on the analysis, one or more routes to the one or more ports are determined. A report is generated that is descriptive of the one or more ports and the one or more routes.

20 Claims, 15 Drawing Sheets

Related U.S. Application Data continuation of application No. 16/020,865, filed on Jun. 27, 2018, now Pat. No. 11,108,805.

(51) Int. Cl.
*H04L 41/0866* (2022.01)
*H04L 43/06* (2022.01)

(52) U.S. Cl.
CPC ...... *H04L 63/0272* (2013.01); *H04L 63/1433* (2013.01); *H04L 63/1441* (2013.01)

(56) References Cited

U.S. PATENT DOCUMENTS

| | | | |
|---|---|---|---|
| 7,685,281 | B1 | 3/2010 | Saraiya |
| 8,250,654 | B1 | 8/2012 | Kennedy et al. |
| 8,566,269 | B2 | 10/2013 | Jajodia et al. |
| 8,949,387 | B2 | 2/2015 | Dickens et al. |
| 9,276,951 | B2 | 3/2016 | Choi et al. |
| 9,912,549 | B2 * | 3/2018 | Rieke ............. H04L 63/1425 |
| 9,923,787 | B2 | 3/2018 | Ngoo et al. |
| 10,389,608 | B2 * | 8/2019 | Searle ............. H04L 43/20 |
| 10,469,324 | B2 | 11/2019 | Cook et al. |
| 11,095,523 | B2 | 8/2021 | Cook et al. |
| 11,108,805 | B2 | 8/2021 | Dodge et al. |
| 11,671,442 | B2 | 6/2023 | Dodge et al. |
| 2002/0091942 | A1 | 7/2002 | Cooper et al. |
| 2006/0174337 | A1 * | 8/2006 | Bernoth ............. H04L 63/0263 726/11 |
| 2007/0136788 | A1 | 6/2007 | Monahan et al. |
| 2008/0059416 | A1 | 3/2008 | Forbes |
| 2008/0066160 | A1 | 3/2008 | Becker et al. |
| 2008/0155537 | A1 | 6/2008 | Dinda |
| 2011/0213870 | A1 | 9/2011 | Cai et al. |
| 2011/0219434 | A1 | 9/2011 | Betz et al. |
| 2012/0079464 | A1 | 3/2012 | De Smet |
| 2012/0084862 | A1 | 4/2012 | Freeman et al. |
| 2012/0124198 | A1 * | 5/2012 | Tomita ............. H04L 41/022 709/224 |
| 2013/0047230 | A1 | 2/2013 | Krishnan et al. |
| 2013/0111033 | A1 | 5/2013 | Mao |
| 2013/0227697 | A1 | 8/2013 | Zandani |
| 2014/0189125 | A1 | 7/2014 | Amies et al. |
| 2014/0236579 | A1 | 8/2014 | Kurz |
| 2014/0341218 | A1 | 11/2014 | Bays et al. |
| 2015/0006458 | A1 | 1/2015 | Zadka |
| 2015/0281269 | A1 | 10/2015 | Ali-Ahmad et al. |
| 2015/0295761 | A1 | 10/2015 | Wang et al. |
| 2016/0112269 | A1 | 4/2016 | Singh et al. |
| 2017/0093640 | A1 * | 3/2017 | Subramanian ......... H04L 67/51 |
| 2017/0293501 | A1 | 10/2017 | Barapatre |
| 2018/0145879 | A1 * | 5/2018 | Cook ............. H04L 41/122 |
| 2018/0357119 | A1 | 12/2018 | Yagi |
| 2019/0334949 | A1 * | 10/2019 | Guri ............. H04L 63/1416 |
| 2020/0007569 | A1 | 1/2020 | Dodge et al. |
| 2020/0067962 | A1 | 2/2020 | Tan |
| 2020/0314145 | A1 | 10/2020 | Bolignano et al. |
| 2021/0377126 | A1 | 12/2021 | Cook et al. |

FOREIGN PATENT DOCUMENTS

| | | |
|---|---|---|
| CN | 102334111 A | 1/2012 |
| CN | 102413012 A | 4/2012 |
| CN | 103650430 | 3/2014 |
| CN | 104363159 | 2/2015 |
| CN | 106063223 A | 10/2016 |
| CN | 106603507 A | 4/2017 |
| CN | 108011893 A | 5/2018 |
| CN | 108200106 A | 6/2018 |
| GB | 2424539 | 9/2006 |
| JP | 2015204614 | 11/2015 |
| WO | 2005101789 | 10/2005 |
| WO | 2010114715 A1 | 10/2010 |
| WO | 2015127894 A1 | 9/2015 |
| WO | 2017094845 | 6/2017 |

OTHER PUBLICATIONS

Su Xijuan, et al., "A Virtual Resource Description and Discovery Model Based on Hybrid Granularity", Telecommunications Science, Feb. 20, 2013, pp. 43-50, 29(2).

Office Action mailed Nov. 24, 2023 in Chinese Patent Application No. 201980043063.6, Amazon Technologies, Inc., pp. 1-25 (including translation).

Office Action mailed Nov. 27, 2023 in European patent application No. 19740452.8, Amazon Technologies, Inc., 1 pp. 1-5.

Kals, Stefan, et al. "Secubat: a web vulnerability scanner." Proceedings of the 15th international conference on World Wide Web. ACM, 2006, pp. 1-10.

Burns, James, et al. "Automatic management of network security policy." DARPA Information Survivability Conference & Exposition II, 2001. DISCEX'01. Proceedings. vol. 2. IEEE, 2001, pp. 1-15.

Wang, Anduo, et al. "Declarative network verification." International Symposium on Practical Aspects of Declarative Languages. Springer Berlin Heidelberg, 2009, pp. 1-15.

"Security Monkey Quick Start Guide", Retrieved from URL: http://securitymonkey.readthedocs.io/en/latest/quickstart.html, pp. 1-27.

International Search Report and Written Opinion, Dated Mar. 1, 2018, Amazon Technologies, Inc., pp. 1-13.

Tyler Wall, "Common Basic Port Scanning Techniques," Jul. 5, 2016, pp. 1-4.

U.S. Appl. No. 16/672,120, filed Nov. 1, 2019, John Cook, et al.

"Security Monkey Quick Start Guide", Retrieved from URL: http://securitymonkey.readthedocs.io/en/latest/quickstart.html, Retrieved from the internet on Feb. 24, 2017, pp. 1-27.

International Search Report and Written Opinion from PCT/US2019/039250, dated Sep. 12, 2019, (Amazon Technologies, Inc.), pp. 1-13.

Kreutz et al., "Software-Defined Networking: A Comprehensive Survey", IEEE, Retrieved From https://arxiv.org/pdf/1406.0440.pdf, Published May 31, 2014, (Year: 2014). pp. 1-61.

Backes J. et al. (2019) Reachability Analysis for AWS-Based Networks. In: Dillig I., Tasiran S. (eds) Computer Aided Verification. GAV 2019. Lecture Notes in Computer Science, vol. 11562. Springer, Cham. https://doi.org/10.1007/978-3-030-25543-5_14 (Year:2019), pp. 1-15.

Office Action mailed Feb. 22, 2022 in Japanese Patent Application No. 2020-570434, Amazon Technologies, Inc, pp. 1-7 (including translation).

\* cited by examiner

AUTOMATED PACKETLESS NETWORK REACHABILITY ANALYSIS

This application is a continuation of U.S. patent application Ser. No. 17/459,908, filed Aug. 27, 2021, which is a continuation of U.S. patent application Ser. No. 16/020,865, filed Jun. 27, 2018, now U.S. Pat. No. 11,108,805, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1:
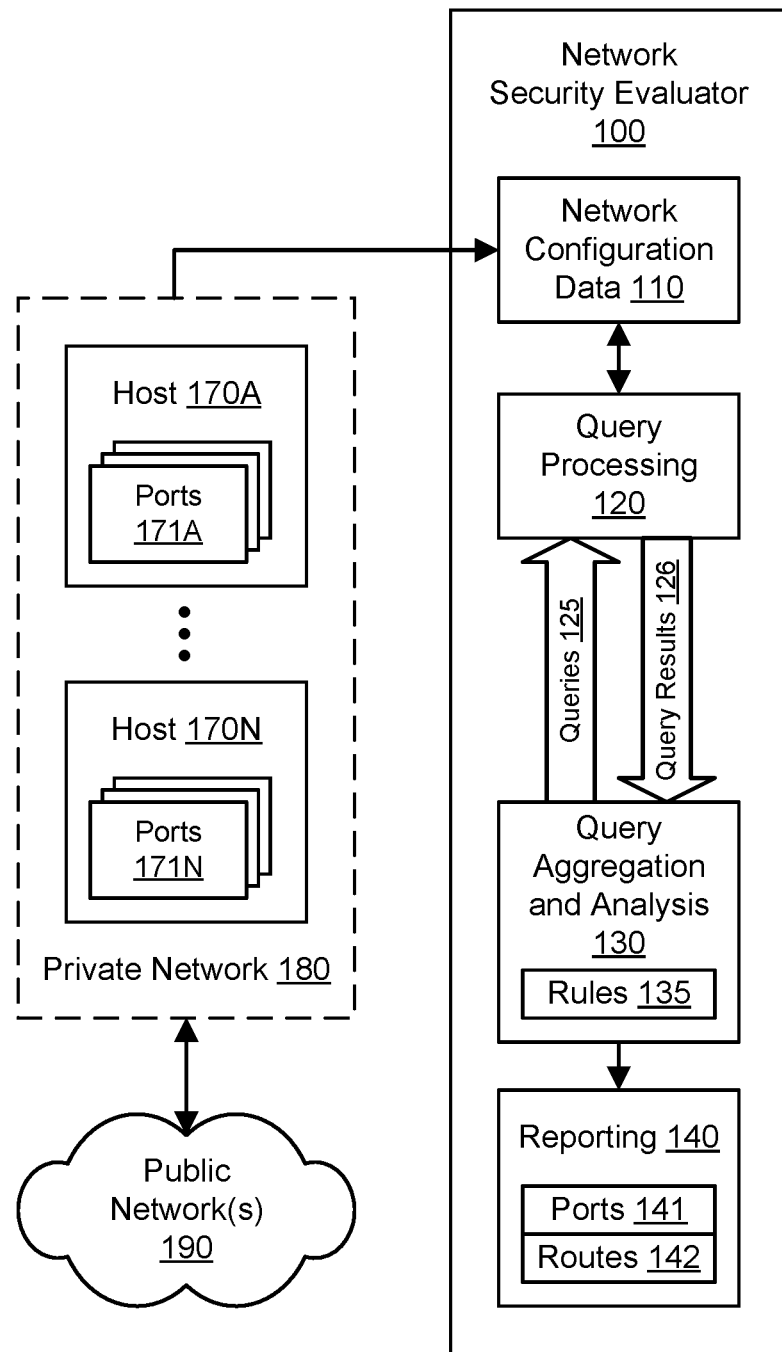
FIG. 1 illustrates an example system environment for automated packetless network reachability analysis, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated packetless network reachability analysis are described. In some embodiments, a network reachability analysis is performed without necessarily performing a conventional port scan. In prior approaches to port scanning, packets would be sent from an external entity (e.g., over a public network) to a variety of ports on one or more computers, and responses would be awaited; such a port scan might take days and use undue network bandwidth. Without sending packets to ports, the network reachability analysis described herein may determine which ports (if any) at a computer are reachable, e.g., to the public Internet or to another computer on the same network. The network reachability analysis may also determine one or more routes to those ports from external entities. The network reachability analysis may combine data from different sources to reach a conclusion. In one embodiment, the network reachability analysis may query a set of network configuration data for a network to which the computer belongs. In one embodiment, the network reachability analysis may acquire data from agent software installed on the computer, e.g., to determine what processes are listening on open ports. The network reachability analysis may produce a report that describes aspects of its findings, e.g., any open and reachable ports, the routes to those ports, the processes listening on those ports, the configuration settings that are associated with the ports being open and reachable, any security concerns tied to the open and reachable ports, any corrective actions (e.g., changing the configuration settings) that would remediate the security concerns, and/or any other suitable information. The network reachability analysis may be performed in an automated manner, e.g., according to a schedule or as triggered by an event, and not necessarily as directly initiated by an end user. Using the techniques described herein, the security of a network may be analyzed quickly and efficiently, in contrast to the time-consuming and resource-intensive nature of conventional port scanning.

As one skilled in the art will appreciate in light of this disclosure, embodiments may be capable of achieving certain technical advantages, including some or all of the following: (1) improving the speed of network reachability analysis by eliminating the need to send packets to a large number of ports on many computers and wait for responses; (2) reducing the network bandwidth requirements of network reachability analysis by eliminating the need to send packets to a large number of ports on many computers; (3) improving the security of a network by providing insight into the routes by which ports are reachable; (4) improving the security of a network by providing insight into the processes that are listening on open and reachable ports; (5) improving the security of a network by reporting the configuration settings that result in ports being reachable, along with reporting changes to those settings that would remediate security concerns; (6) improving the security of a network by providing a more complete view than conventional port scans, which only check for reachability from the scanner's location; and so on.

FIG. 1 illustrates an example system environment for automated packetless network reachability analysis, according to some embodiments. In some embodiments, a network security evaluator 100 may analyze the security of one or more computing devices on a network, e.g., to determine which ports (if any) on those computers are open and reachable. The devices subjected to analysis may also be referred to as computers, host computers, hosts, servers, instances, or computing resources. As shown in FIG. 1, a set of computing devices such as hosts 170A through 170N may be configured within a private network 180. Although two hosts 170A and 170N are shown for purposes of illustration and example, any suitable number and configuration of hosts may be analyzed by the network security evaluator 100. The hosts 170A-170N may be the same or may vary in their hardware resources, software resources, network configurations, and so on.

The hosts 170A-170N may be configured to communicate with one another using network resources of the private network 180. Each of the hosts 170A-170N may offer network ports, such as ports 171A for host 170A and ports 171N for host 170N. Ports 171A-171N may represent endpoints of network communication and may be identified by port numbers. Ports may be used by networking protocols or transport layer protocols such as the Transmission Control Protocol (TCP) and the User Datagram Protocol (UDP). Certain port numbers may be reserved, by convention, for certain services. Applications that implement common services may use reserved port numbers to receive service requests from clients by "listening" to the ports and establishing a one-to-one server-client dialog in response to requests. For example, an application that implements the Simple Mail Transfer Protocol (SMTP) usually listens on TCP port 25 for incoming requests, and an application that implements the Post Office Protocol (POP) usually listens on TCP port 110 for incoming requests.

The private network 180 may include computers that are owned and/or operated by a particular business entity or other organization. In one embodiments, an owner or operator of the private network 180 may expect that the hosts 170A-170N should be generally inaccessible or have some degree of isolation with respect to external entities, e.g., computers connected via one or more public networks 190 such as the public Internet. However, one or more ports on the hosts 170A-170N may indeed be reachable to the public network(s) 190, and in a way that may pose security concerns. For example, particular processes listening on particular open ports may be vulnerable to malicious attacks from external entities, e.g., in order to gather sensitive data from the hosts 170A-170N or take control of the hosts. Using the techniques described herein, any reachable ports on the hosts 170A-170N may be found and potentially remediated to solve the security concerns.

Without necessarily sending packets to ports 171A-171N, the network security evaluator 100 may determine which ports (if any) are reachable. In one embodiment, the reachability analysis may determine whether a port is reachable via the public network(s) 190. In one embodiment, the reachability analysis may determine whether a port is reachable via the private network(s) 190, e.g., to another one of the hosts 170A-170N. In one embodiment, the reachability analysis may confirm that no ports on a host are reachable. For a particular one or more hosts, the analysis may be performed by network security evaluator 100 in an automated manner, e.g., according to a schedule or as triggered by an event, and not necessarily as directly initiated by an end user. For example, the analysis may be triggered by an event associated with a change to the network configuration of a host. The event may be issued by a service or system of the private network 180 that monitors such changes.

In one embodiment, the network security evaluator 100 may use a set of network configuration data 110 to perform the network reachability analysis for one or more of the hosts 170A-170N. The network configuration data 110 may be associated with a network (e.g., private network 180) to which the host under analysis belongs. The network configuration data may represent a snapshot of network configurations or other properties of hosts 170A-170N as well as networking devices (routers, switches, and so on). For example, the data 110 may include information about Virtual Private Clouds (VPCs), subnets, instances, security groups, access control lists (ACLs), load balancers, and so on. The data 110 may be used to model of how networking works in the network 180, e.g., according to a set of virtual networking rules. In one embodiment, elements of the network configuration data 110 may be provided by services of the private network 180. For example, the network 180 may include a computing virtualization service that provides (e.g., via an API) network configuration data regarding virtual compute instances, and the network may include various types of storage virtualization services that provide (e.g., via APIs) network configuration data regarding virtual storage instances. The data 110 may, for example, identify instances of the networking primitives that are implemented in the network 180, include descriptions of the instances (e.g., roles assigned to computation instances, permissions granted to or denied to resource instances, IP addresses assigned to the instances, etc.), describe relationships among the instances (e.g., paths over the network between instances), and describe interfaces or access points to external entities (e.g., computation instances that can be accessed by entities external to the network). Further aspects of the network configuration data 110 and its acquisition are discussed below with respect to FIG. 8 through FIG. 15.

Turning back to FIG. 1, in one embodiment, the network security evaluator 100 may include a query processing component 120 that can query the network configuration data 110. The network security evaluator 100 may also include a query aggregation and analysis component 130 that can generate queries 125, provide the queries to the query processing component 120, receive query results 126, and perform analysis of the results to determine which ports (if any) are reachable. The queries 125 may be expressed according to a query language. In one embodiment, the query language may represent a declarative logic programming language that allows the network security evaluator 100 to express queries, including recursive queries, about networks as constraint problems, and provide results for the queries by resolving the queries using a constraint solver (e.g., a satisfiability modulo theories (SMT) solver) engine. An example of a query may be "VNVS query -i list: can-ssh(A,B)" that requests a virtual network verification service (VNVS) to provide a list of all pairs of instances such that instance A can SSH to instance B. The network security evaluator 100 may dynamically build the queries 125 or select prebuilt queries according to the needs of the analysis. In one embodiment, the queries need not be written by an end user of the analyzer 100, e.g., a network administrator who seeks to analyze the network security of one or more hosts under her or his management. Further aspects of the queries 125 are discussed below with respect to FIG. 8 through FIG. 15.

Turning back to FIG. 1, in one embodiment, the network security evaluator 100 may operate according to a package of rules 135 associated with network reachability. In one embodiment, queries 125 may be generated according to the rules 135. For example, the rules 135 may define a set of port numbers for common services to be checked for reachability, and the analyzer 100 may generate queries to assess whether those port numbers are reachable for hosts under analysis. The queries 125 may be generated to acquire configuration data that affects network access for one or more hosts under analysis. The rules package 135 may analyze networking components such as security groups, virtual private clouds (VPCs), subnets, access control lists, elastic load balancers, internet gateways, egress-only internet gateways, network address translations, routing tables, peered VPCs, virtual private networks (VPNs), direct connections (DX), and so on. In one embodiment, query results 126 may be analyzed according to the rules 135, e.g., to determine which ports are reachable using an understanding of how the various types of networking components operate.

If any ports are deemed to be reachable, the network security evaluator 100 may also determine one or more routes to those ports from external entities. In one embodiment, the routes may be determined according to the rules 135 and/or using the query language. For example, using one or more queries, the analyzer 100 may determine that there is a path or route over the network (i.e., that there is network connectivity) between the hosts or between a host and the external entities (e.g., a path from the resource to an HTTPS gateway via which external entities may access resources on the virtual network). A path may be a direct path over the network that provides network connectivity between endpoints, or alternatively may be a transitive path that passes through one or more hops on a route and that provides network connectivity between endpoints. By applying a set of predefined rules 135 to assess network reachability for a host, the query aggregation and analysis component 130 may represent an automated solution that removes the guesswork and complexity of a manual analysis (e.g., by a network administrator).

In one embodiment, for example, the query aggregation and analysis component 130 may use the rules 135 to check whether an instance allows Internet Control Message Protocol (ICMP) access from the Internet or from outside any trusted locations (if so configured). In one embodiment, as another example, the query aggregation and analysis component 130 may use the rules 135 to check whether an instance has any TCP/UDP ports that are open and reachable from the Internet or from outside any trusted locations (if so configured). The rules 135 may specifically examine insecure ports, administrative ports, database ports, intranet ports, and other types of ports. In one embodiment, the query aggregation and analysis component 130 may use the rules 135 to check whether an instance is not accessible from anywhere on any port. In one embodiment, the query aggregation and analysis component 130 may use the rules 135 to check whether a subnet allows ICMP or TCP/UDP port access from outside trusted locations, for each security group. In one embodiment, the query aggregation and analysis component 130 may use the rules 135 to check whether a subnet has instances that are not accessible from anywhere, or has all inbound traffic blocked, or has no elastic network interfaces (ENIs).

In one embodiment, any reachable ports may be found by the evaluator 100 without performing a conventional port scan. In one embodiment, the evaluator 100 may confirm a packetless finding by performing a port scan of limited scope, e.g., only on the affected port(s). For example, if TCP port 22 is found to be reachable on host 170A, then the network security evaluator 100 may cause an external entity (e.g., another server connected to the host 170A via the public network 190) to send one or more packets to TCP port 22 on host 170A, wait for a response from the host, and report back to the analyzer. If no such response is received, then the network security evaluator 100 may determine that the port is not actually reachable. For example, the port may be shielded by a firewall. If a response is received, then the network security evaluator 100 may confirm that the port is open and reachable. By limiting such a port scan to ports that are already estimated to be reachable, the network security evaluator 100 may significantly reduce the time and network bandwidth required for a full port scan.

The network security evaluator 100 may generate findings about network reachability and/or network security for one or more of the hosts 170A-170N under analysis. As will be discussed below with respect to FIG. 3, the network security evaluator 100 may combine data from different sources (potentially including on-host data collected by an agent) to generate such findings. Turning back to FIG. 1, using a reporting component 140, the network security evaluator 100 may produce a report that describes aspects of its findings. In one embodiment, the reporting component 140 may indicate or describe one or more ports 141 that are reachable for a particular host. In one embodiment, the reporting component 140 may indicate or describe one or more ports 141 that are not reachable for a particular host. In one embodiment, the reporting component 140 may indicate or describe one or more routes 142 to the ports that are reachable. In one embodiment, the reporting component 140 may instead disclose that no ports are reachable for a particular host. An example of such a report is discussed with respect to FIG. 5.

In one embodiment, a whitelist may indicate trusted locations, and specific ports or ranges of ports may be excluded from the reporting 140 if found to be reachable from a trusted location. In various embodiments, various sources of data may be used to generate the whitelist, such as industry-standard knowledge, customer input, machine learning based on multiple customers, and/or other suitable sources. The contents of the whitelist may vary from customer to customer. The contents of the whitelist may change over time.

Turning back to FIG. 1, the reporting component 140 may present the findings in any suitable manner. In one embodiment, the reporting component 140 may present the findings in a graphical user interface (GUI), e.g., to a network administrator. In one embodiment, the GUI may include an interactive portion such that it may receive user input associated with the findings, e.g., as discussed below with respect to FIG. 4. Turning back to FIG. 1, in one embodiment, the reporting component 140 may persistently store the findings in a file or other data object, and the file or data object may be read by a network administrator or other suitable entity. In one embodiment, the reporting component 140 may send the findings using e-mail or another messaging system, e.g., to an account accessible by a network administrator.

Figure 15:
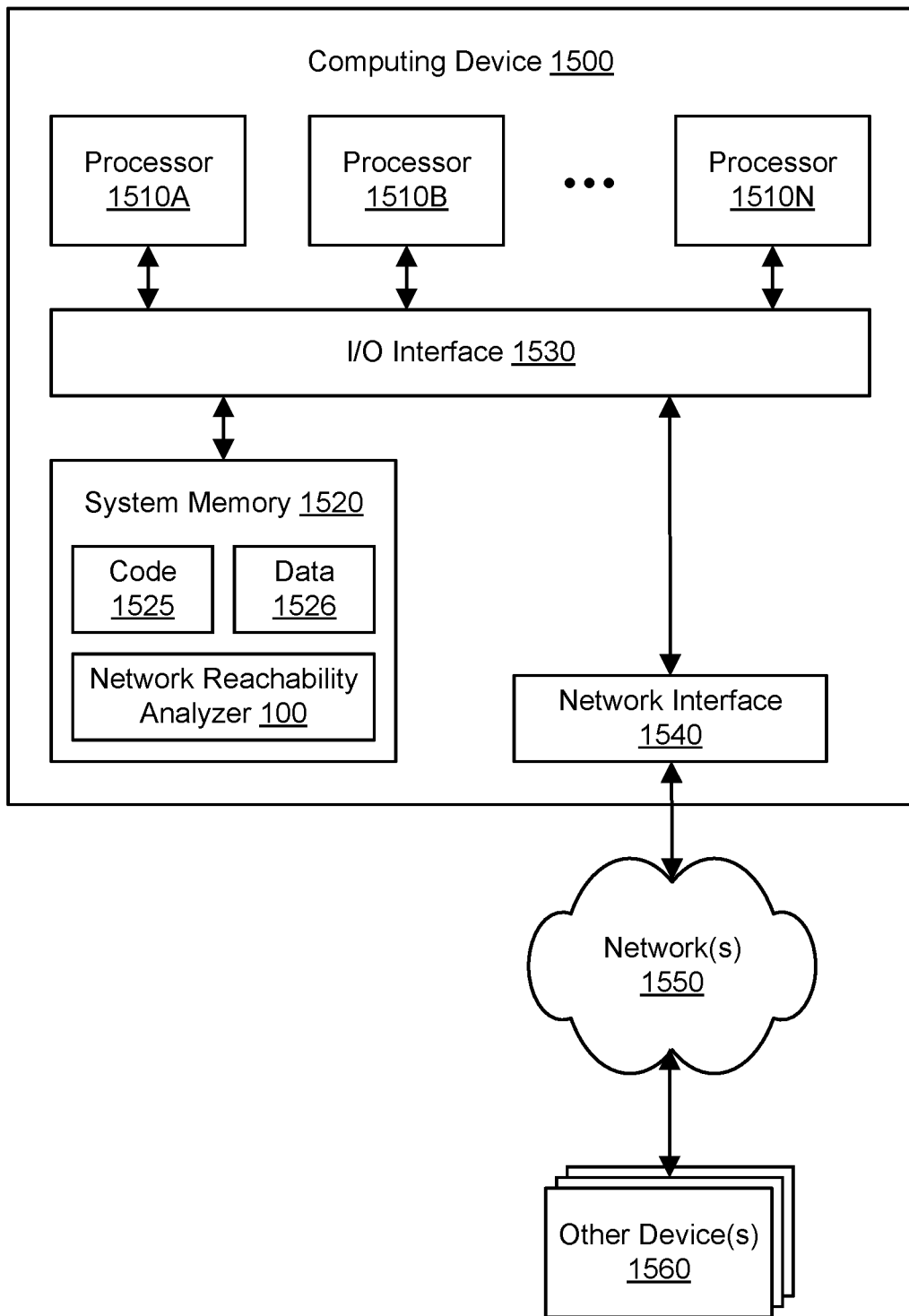
FIG. 15 illustrates an example computing device that may be used in some embodiments.

The network security evaluator 100 and hosts 170A-170N may be implemented using any suitable number and configuration of computing devices, any of which may be implemented by the example computing device 1500 illustrated in FIG. 15. The computing devices may be located in any suitable number of data centers or geographical locations. In various embodiments, at least some of the functionality of the network security evaluator 100 may be provided by the same computing device or by different computing devices. If any of the components of the network security evaluator 100 are implemented using different computing devices, then the components and their respective computing devices may be communicatively coupled, e.g., via one or more networks. Each of the components of the network security evaluator 100 may represent any combination of software and hardware usable to perform their respective functions, as discussed as follows. Operations implemented by the network security evaluator 100 may be performed automatically, e.g., without a need for user initiation or user intervention after an initial configuration stage, and programmatically, e.g., by execution of program instructions on at least one computing device. It is contemplated that the threat modeler network security evaluator 100 and network 180 may include additional components not shown, fewer components than shown, or different combinations, configurations, or quantities of the components shown.

The network security evaluator 100 may be implemented in a service-oriented system in which multiple services collaborate according to a service-oriented architecture. In such an environment, the network security evaluator 100 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the network security evaluator 100. To enable clients to invoke its functionality, the network security evaluator 100 may expose any suitable interface(s), such as one or more APIs or other programmatic interfaces and/or graphical user interfaces (GUIs). In one embodiment, the functionality of the network security evaluator 100 may be offered to clients in exchange for fees.

The network security evaluator 100 may be coupled to the hosts 170A-170N, service clients, other services, or other entities via one or more networks. In various embodiments, the network(s) may encompass any suitable combination of networking hardware and protocols necessary to establish network-based communications between the network security evaluator 100 and the hosts 170A-170N. For example, the network(s) may generally encompass the various telecommunications networks and service providers that collectively implement the Internet. The network(s) may also include private networks such as local area networks (LANs) or wide area networks (WANs) as well as public or private wireless networks. For example, both the network security evaluator 100 and the hosts 170A-170N may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the network security evaluator 100 and the Internet as well as between the Internet and the hosts 170A-170N. It is noted that in some embodiments, the network security evaluator 100 may communicate with the hosts 170A-170N using a private network rather than the public Internet.

In some embodiments, aspects of the network security evaluator 100 and/or hosts 170A-170N may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 2:
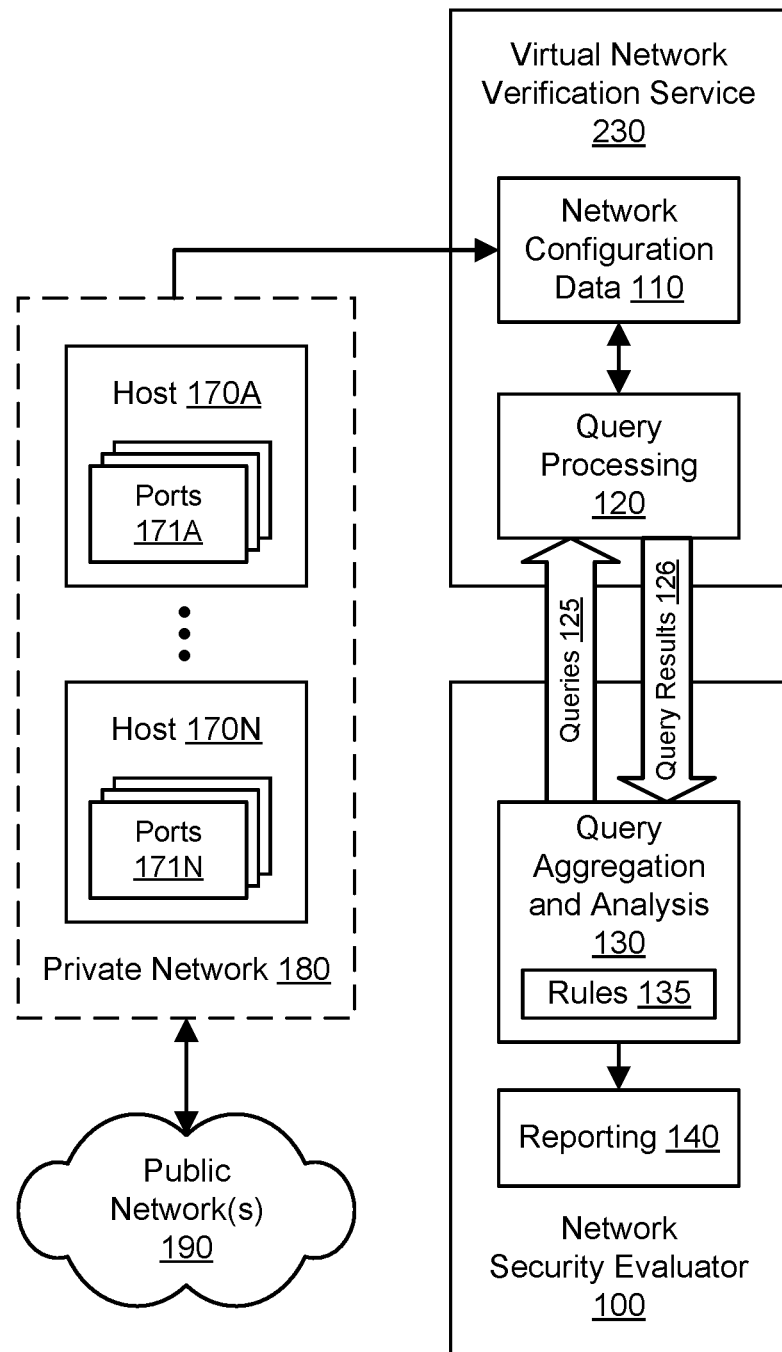
FIG. 2 illustrates further aspects of the example system environment for automated packetless network reachability analysis, including an interaction with a virtual network verification service to assist in the analysis, according to some embodiments.

FIG. 2 illustrates further aspects of the example system environment for automated packetless network reachability analysis, including an interaction with a virtual network verification service to assist in the analysis, according to some embodiments. In one embodiment, the network configuration data 110 may be acquired and maintained by a virtual network verification service 230. The virtual network verification service 230 may also include a query processing component 120 that is capable of receiving queries 125, answering the queries using the network configuration data 110, and responding with query results 126. The virtual network verification service 230 may offer its services to one or more clients, including the network security evaluator 100. Further aspects of the virtual network verification service are discussed below with respect to FIG. 8 through FIG. 14.

Figure 3:
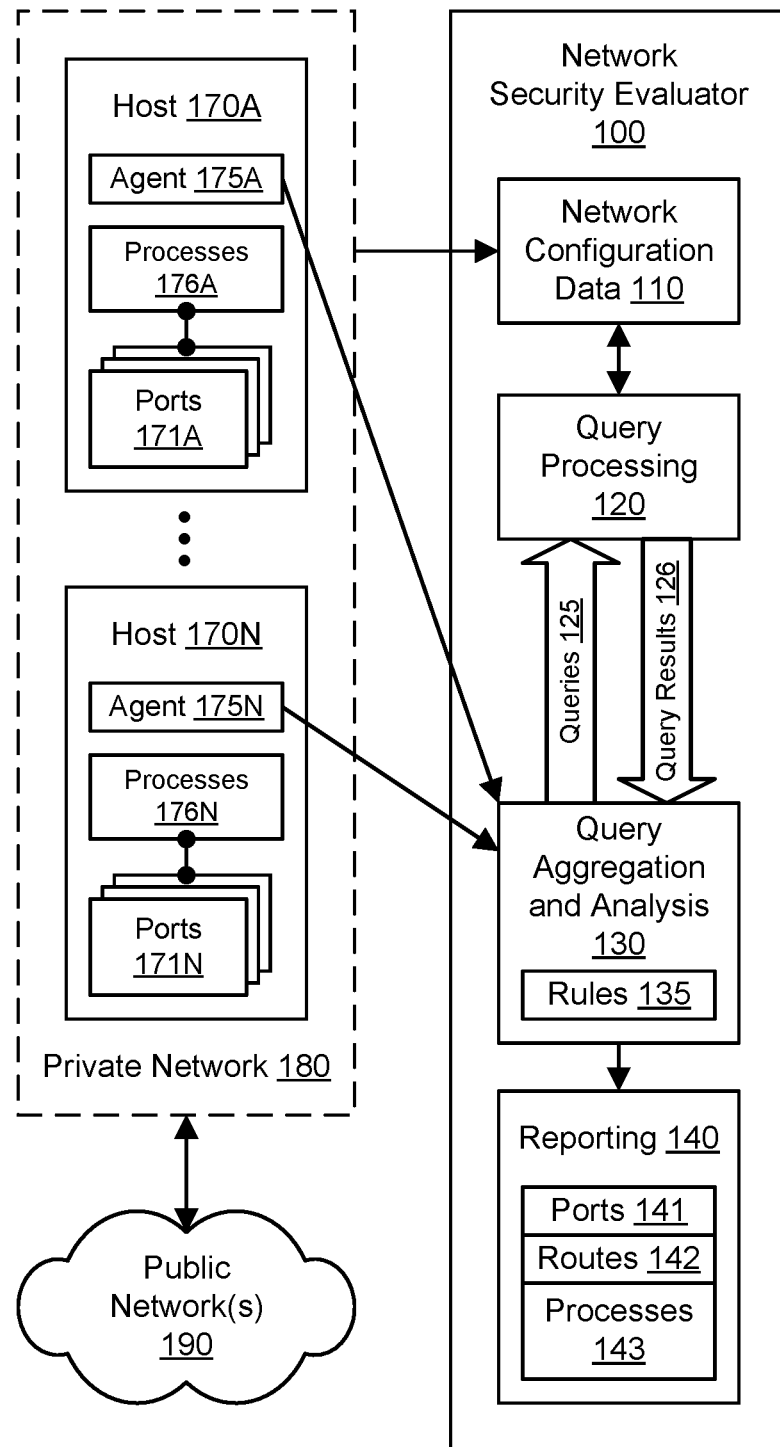
FIG. 3 illustrates further aspects of the example system environment for automated packetless network reachability analysis, including the use of an agent on a computer subjected to the analysis, according to some embodiments.

FIG. 3 illustrates further aspects of the example system environment for automated packetless network reachability analysis, including the use of an agent on a computer subjected to the analysis, according to some embodiments. In one embodiment, the network security evaluator 100 may combine data from different sources to reach a conclusion. In one embodiment, the network security evaluator 100 may acquire data from agent software installed on the computer, e.g., to determine what processes are listening on ports. A port may be considered "open" if a process is listening on the port. Processes may include services, applications, service daemons, and other forms of executable program code. As shown in the example of FIG. 3, agent 175A may be installed on host 170A, agent 175N may be installed on host 170N, and so on. As also shown in the example of FIG. 3, processes 176A may be resident (and potentially listening on ports 171A) on host 170A, and processes 176N may be resident (and potentially listening on ports 171N) on host 170N. In some embodiments, the agents 175A-175N may represent the same binary file or different binary files, e.g., if the hosts 170A-170N represent the same or different configurations of hardware and operating system software.

The agents 175A-175N may be capable of gathering insights into the configuration of the hosts 170A-170N. In one embodiment, the agents 175A-175N may monitor the operation of the corresponding hosts, e.g., to determine when a port is opened and which process is associated with the port. In one embodiment, the agents 175A-175N may interact with the operating system of the corresponding hosts, e.g., to inquire as to which ports are open and/or which processes 176A-176N are listening on the ports. In one embodiment, the agents 175A-175N may be under the control of the network security evaluator 100, such that the network reachability analyzer may instruct an agent to find the process(es) listening on a specific port that the analyzer has already deemed to be reachable. The agents 175A-175N may be configured to report their findings to the query aggregation and analysis component 130.

In one embodiment, based on information relayed from agents 175A-175N, the query aggregation and analysis component 130 may use the rules 135 to check whether a process opened a port on an atypical port number. In one embodiment, based on information relayed from agents 175A-175N, the query aggregation and analysis component 130 may use the rules 135 to check whether an instance has an open port that is not reachable from anywhere. Using analysis of the data gathered by the agents 175A-175N, such as the knowledge of which processes are listening on which ports, the reporting component 140 may produce a report that indicates or describes the processes 143 that are listening on open and reachable ports 141. In one embodiment, the reporting component 140 may indicate or describe processes that are using unusual or unexpected ports and which may therefore pose a security threat.

Figure 4:
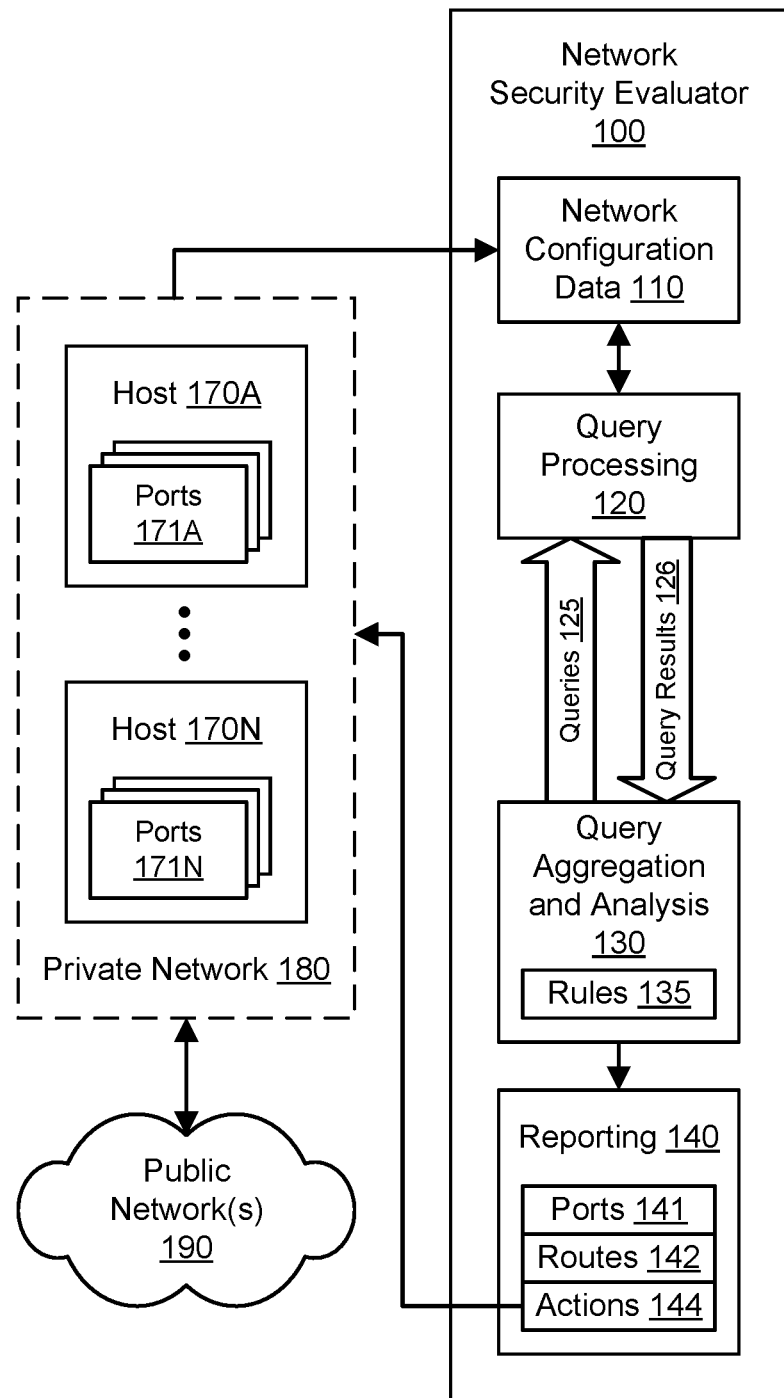
FIG. 4 illustrates further aspects of the example system environment for automated packetless network reachability analysis, including the recommendation and/or performance of corrective actions, according to some embodiments.

FIG. 4 illustrates further aspects of the example system environment for automated packetless network reachability analysis, including the recommendation and/or performance of corrective actions, according to some embodiments. In one embodiment, the query aggregation and analysis 130 may determine the reasons why ports are reachable. For example, one or more configuration settings may be the cause of a reachable port. By applying the rules 135 to the data gathered from one or more sources (e.g., the network configuration data 110 and the agents 175A-175N), the network configuration analyzer may determine the one or more configuration settings that are responsible for a port being reachable. The reporting component 140 may then report such findings.

In one embodiment, the network security evaluator 100 may also recommend corrective actions 144 that, if taken, would be expected to solve or remediate security concerns associated with a reachable port. For example, if a port is reachable due to the host's membership in a particular security group, then the recommendations may include changing a configuration setting for that security group so that the port is not accessible to external computers. In one embodiment, such corrective actions 144 may be indicated or described by the reporting component 140. In one embodiment, a corrective action may be presented in a GUI with an interface element that, if selected by the user, automatically corrects the problem. For example, the reporting component 140 may generate a screen in a user interface that describes the recommended fix and includes a button (or other GUI element) that implements a change to the appropriate configuration setting if pressed by the user.

Figure 5:
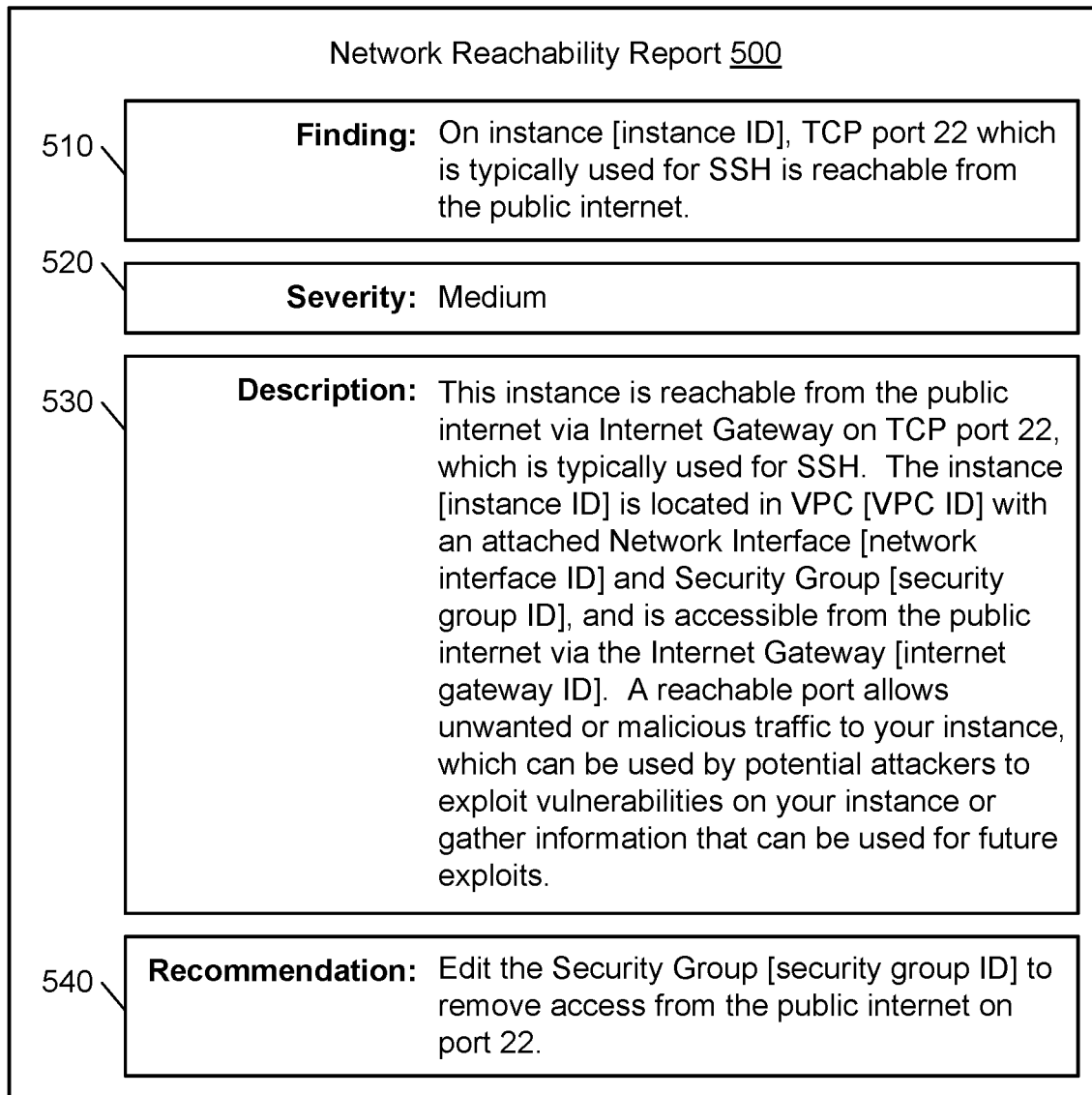
FIG. 5 illustrates an example of a report generated using automated packetless network reachability analysis, according to some embodiments.

FIG. 5 illustrates an example of a report generated using automated packetless network reachability analysis, according to some embodiments. The network security evaluator 100 may produce a report that describes aspects of its findings, e.g., any reachable ports, the routes to those ports, the processes listening on those ports, the configuration settings that are associated with the ports being reachable, any security concerns tied to the reachable ports, any corrective actions (e.g., changing the configuration settings) that would remediate the security concerns, and/or any other suitable information. FIG. 5 illustrates an example of a network reachability report 500 for a particular host (referred to by an instance ID) and a particular port on that host. The report 500 may include a high-level finding 510 that indicates, for example, the instance ID of the instance under analysis, the TCP port number affected, and the service that is typically associated with the port. In this example, the TCP port number is 22 and is typically used for Secure Shell (SSH) purposes. The report 500 may also include an indication of the severity 520 of the problem (e.g., high, medium, or low). The report 500 may include a more detailed description 530 of the finding. As shown in the example of FIG. 5, the description 530 may indicate the route by which the port is reachable from the public Internet: in this case, via a particular internet gateway. In one embodiment, the description 530 may indicate the reasons why access is allowed, e.g., due to the configuration of a security group, an access control list, a routing table, an internet gateway, and so on. The description 530 may also indicate a particular Virtual Private Cloud (VPC) to which the instance belongs, the ID of a network interface for the instance, the ID of a security group for the instance, and so on. Additionally, the description 530 may describe the potential security problem that is posed by the port being reachable. Finally the report 500 may include a recommendation 540 for a corrective action to remediate the security concern. In this example, the recommendation is to edit the security group to remove access to this particular port via the public Internet. As discussed above with respect to FIG. 4, in one embodiment, the report 500 may include a user interface element that, if activated by user input, automatically implements the recommendation 540. In one embodiment, the report 500 may include a visualization that shows a network topology of the analysis target. The visualization may include highlighted findings, color coding of threat severity, and user interaction.

Figure 6:
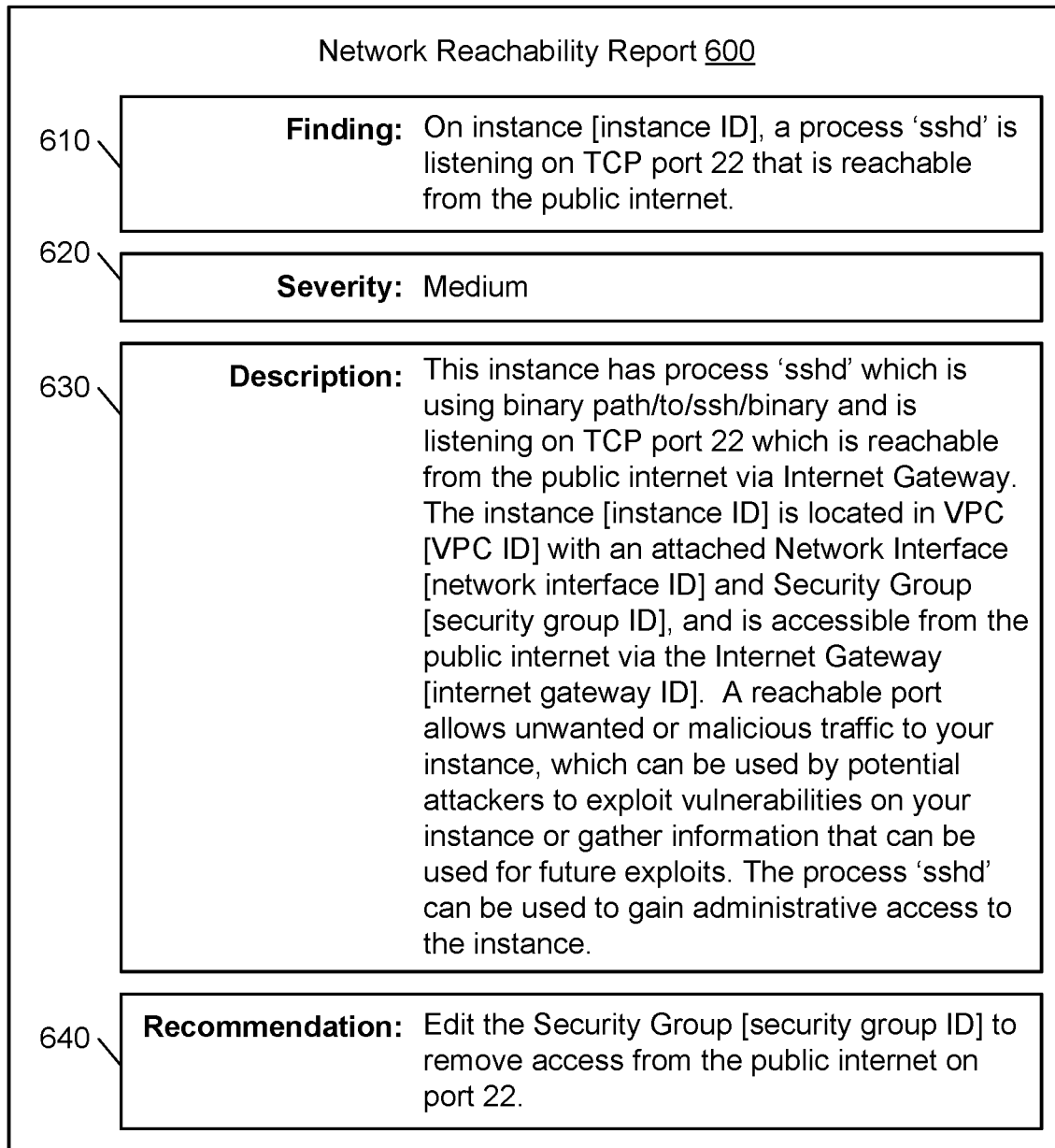
FIG. 6 illustrates an example of a report generated using automated packetless network reachability analysis and using an agent on the computer subjected to the analysis, according to some embodiments.

FIG. 6 illustrates an example of a report generated using automated packetless network reachability analysis and using an agent on the computer subjected to the analysis, according to some embodiments. In one embodiment, the report 500 discussed above may be generated without using an agent on the host under analysis. As shown in the example of FIG. 6, the use of such an agent may allow for a more detailed reachability report 600. As discussed above, the report 600 may include a high-level finding 610, an indication of the severity 620, a detailed description 630, and a recommendation 640 to correct the problem. By relying on data gathered by an agent, the report 600 may indicate the particular process that is listening on the open and reachable port. In this example, the process is the SSH daemon 'sshd.' The report 600 may also indicate the path of the particular binary file that corresponds to the sshd process. The addition of such process information to the network reachability report may assist in the diagnosis and correction of security problems.

Figure 7:
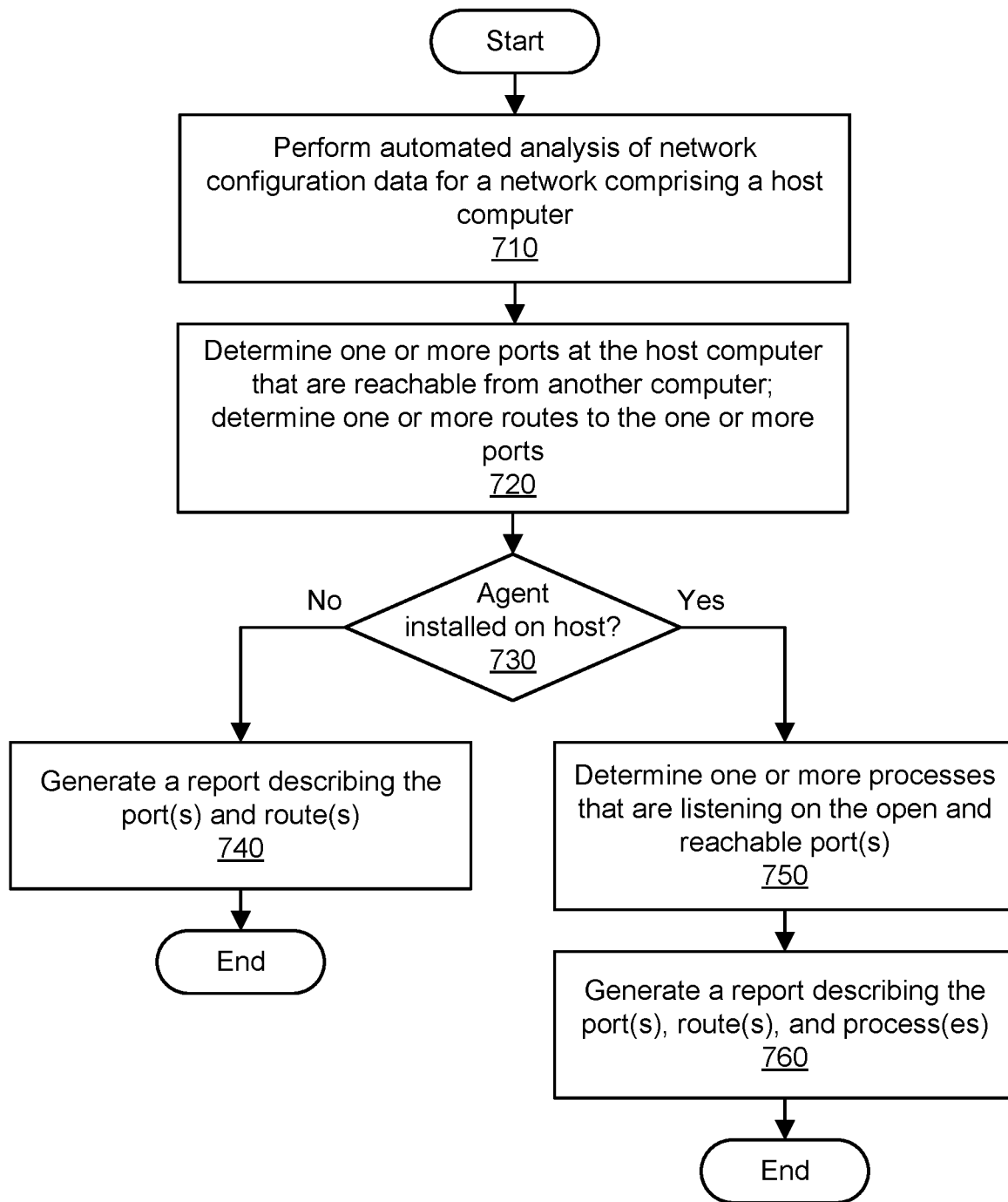
FIG. 7 is a flowchart illustrating a method for automated packetless network reachability analysis, according to some embodiments.

FIG. 7 is a flowchart illustrating a method for automated packetless network reachability analysis, according to some embodiments. As shown in 710, automated analysis of network configuration data may be performed. The network configuration data may relate to a network (such as a private network) having a host computer and potentially other devices, including other computers as well as networking devices (routers, switches, and so on). In one embodiment, the analysis may include querying the network configuration data using one or more queries. The queries may be expressed according to a query language. The network reachability analysis may dynamically build the queries or select prebuilt queries according to the needs of the analysis. In one embodiment, the queries need not be written by an end user of the analyzer 100, e.g., a network administrator who seeks to analyze the network security of one or more hosts under her or his management.

As shown in 720, based on the analysis, the method may determine one or more ports at the host computer that are reachable from another computer. The reachability may be via the public Internet or via a private network to which the host belongs. Based on the analysis, the method may also determine one or more routes by which the port(s) are reachable. For example, a route may indicate that a component is reachable from the internet via an internet gateway, from a Virtual Private Network (VPN) via an internet gateway, from a peered Virtual Private Cloud (VPC), and so on.

As shown in 730, the method may determine whether an agent is installed on the host computer under analysis. The agent may be configured to monitor aspects of the operation of the host computer, e.g., to determine the processes that are listening on open ports. If the agent is not present, then as shown in 740, the method may generate a report that indicates or describes the reachable port(s) as well as the route(s) by which the port(s) are reachable. In one embodiment, the report may also indicate or describe the reason(s) why the port(s) are reachable, such as one or more configuration settings related to a security group or access control list (ACL). In one embodiment, the report may also indicate or describe one or more recommendations for corrective action, such as changing one or more configuration settings.

If the agent is present, then as shown in 750, the method may use data provided by the agent to determine any processes that are listening on the port(s). As shown in 760, the method may generate a report that indicates or describes the open and reachable port(s), the route(s) by which the port(s) are reachable, and any processes listening on the port(s). In one embodiment, the report may also indicate or describe the reason(s) why the port(s) are open and reachable, such as one or more configuration settings. In one embodiment, the report may also indicate or describe one or more recommendations for corrective action, such as changing one or more configuration settings.

Illustrative Rules for Network Reachability

As discussed above, the network security evaluator 100 may operate according to a package of rules 135 associated with network reachability. Although examples of such rules are discussed as follows, the following list of rules is not intended to be comprehensive. The network security evaluator 100 may implement only a portion of the following rules and/or may implement additional rules to evaluate the reachability of computing devices.

In one embodiment, a first rule may analyze an instance with an agent to determine whether the instance has insecure protocols listening on ports that are allowed access from somewhere outside trusted locations. The severity of this finding is high. This finding may be reported along with the port number, the TCP or UDP association of the port, the application (and version) listening on the port, address ranges that can reach the port, and any security groups, access control lists, internet gateways, virtual gateways, and other channels that allow access. For the first rule, the recommendations for corrective action may include editing an access control configuration to restrict access (if access from outside the trusted locations is not needed) and stopping the application (if it is not required for operation).

In one embodiment, a second rule may analyze an instance with an agent to determine whether the instance has an SSH server listening on a port that is accessible from somewhere outside trusted locations. The severity of this finding is medium. This finding may be reported along with the port number, the TCP or UDP association of the port, the application (and version) listening on the port, address ranges that can reach the port, and any security groups, access control lists, internet gateways, virtual gateways, and other channels that allow access. For the second rule, the recommendations for corrective action may include editing an access control configuration to restrict access (if access from outside the trusted locations is not needed) and stopping the application (if it is not required for operation).

In one embodiment, a third rule may analyze an instance with an agent to determine whether the instance has an RDP server listening on a port that is accessible from somewhere outside trusted locations. The severity of this finding is medium. This finding may be reported along with the port number, the TCP or UDP association of the port, the application (and version) listening on the port, address ranges that can reach the port, and any security groups, access control lists, internet gateways, virtual gateways, and other channels that allow access. For the third rule, the recommendations for corrective action may include editing an access control configuration to restrict access (if access from outside the trusted locations is not needed) and stopping the application (if it is not required for operation).

In one embodiment, a fourth rule may analyze an instance with an agent to determine whether the instance has a database server listening on a port that is accessible from somewhere outside trusted locations. The severity of this finding is medium. This finding may be reported along with the port number, the TCP or UDP association of the port, the application (and version) listening on the port, address ranges that can reach the port, and any security groups, access control lists, internet gateways, virtual gateways, and other channels that allow access. For the fourth rule, the recommendations for corrective action may include editing an access control configuration to restrict access (if access from outside the trusted locations is not needed) and stopping the application (if it is not required for operation).

In one embodiment, a fifth rule may analyze an instance with an agent to determine whether the instance has an intranet service listening on a port that is accessible from somewhere outside trusted locations. The severity of this finding is medium. This finding may be reported along with the port number, the TCP or UDP association of the port, the application (and version) listening on the port, address ranges that can reach the port, and any security groups, access control lists, internet gateways, virtual gateways, and other channels that allow access. For the fifth rule, the recommendations for corrective action may include editing an access control configuration to restrict access (if access from outside the trusted locations is not needed) and stopping the application (if it is not required for operation).

In one embodiment, a sixth rule may analyze an instance with an agent to determine whether the instance has a connection open on ports that are allowed access from somewhere outside trusted locations. The severity of this finding is low. This finding may be reported along with the port number, the TCP or UDP association of the port, the application (and version) listening on the port, address ranges that can reach the port, and any security groups, access control lists, internet gateways, virtual gateways, and other channels that allow access. For the sixth rule, the recommendations for corrective action may include editing an access control configuration to restrict access (if access from outside the trusted locations is not needed) and stopping the application (if it is not required for operation).

In one embodiment, a seventh rule may analyze an instance with an agent to determine whether the instance has an application that opens a connection on an atypical port. The severity of this finding is low and may be considered informational rather than a specific threat. This finding may be reported along with the port number, the TCP or UDP association of the port, the application (and version) listening on the port, the usual port for the application, address ranges that can reach the port, and any security groups, access control lists, internet gateways, virtual gateways, and other channels that allow access. For the seventh rule, the recommendations for corrective action may include checking whether the application is behaving as expected.

In one embodiment, an eighth rule may analyze an instance without an agent to determine whether the instance allows ICMP access from somewhere outside trusted locations. The severity of this finding is medium. This finding may be reported along with the address ranges that can reach the port, and any security groups, access control lists, internet gateways, virtual gateways, and other channels that allow access. For the eighth rule, the recommendations for corrective action may include editing an access control configuration to restrict access (if access from outside the trusted locations is not needed).

In one embodiment, a ninth rule may analyze an instance without an agent to determine whether the instance allows access to typically insecure ports (e.g., ports 20, 21, 23, and so on) from somewhere outside trusted locations. The severity of this finding is medium. This finding may be reported along with the port number, the TCP or UDP association of the port, the application that typically uses this port, the address ranges that can reach the port, and any security groups, access control lists, internet gateways, virtual gateways, and other channels that allow access. For the ninth rule, the recommendations for corrective action may include editing an access control configuration to restrict access (if access from outside the trusted locations is not needed).

In one embodiment, a tenth rule may analyze an instance without an agent to determine whether the instance allows access to admin port number 22 (typically used for SSH) from somewhere outside trusted locations. The severity of this finding is medium. This finding may be reported along with the port number, the TCP or UDP association of the port, the application that typically uses this port, the address ranges that can reach the port, and any security groups, access control lists, internet gateways, virtual gateways, and other channels that allow access. For the tenth rule, the recommendations for corrective action may include editing an access control configuration to restrict access (if admin access from outside the trusted admin locations is not needed).

In one embodiment, an eleventh rule may analyze an instance without an agent to determine whether the instance allows access to admin port number 3389 (typically used for RDP) from somewhere outside trusted locations. The severity of this finding is medium. This finding may be reported along with the port number, the TCP or UDP association of the port, the application that typically uses this port, the address ranges that can reach the port, and any security groups, access control lists, internet gateways, virtual gateways, and other channels that allow access. For the eleventh rule, the recommendations for corrective action may include editing an access control configuration to restrict access (if admin access from outside the trusted admin locations is not needed).

In one embodiment, a twelfth rule may analyze an instance without an agent to determine whether the instance allows access to database ports (e.g., ports 1433, 1434, 3306, and so on) from somewhere outside trusted locations. The severity of this finding is low. This finding may be reported along with the port number, the TCP or UDP association of the port, the application that typically uses this port, the address ranges that can reach the port, and any security groups, access control lists, internet gateways, virtual gateways, and other channels that allow access. For the twelfth rule, the recommendations for corrective action may include editing an access control configuration to restrict access (if database access from the internet is not needed).

In one embodiment, a thirteenth rule may analyze an instance without an agent to determine whether the instance allows access to intranet ports from somewhere outside trusted locations. The severity of this finding is low. This finding may be reported along with the port number, the TCP or UDP association of the port, the application that typically uses this port, the address ranges that can reach the port, and any security groups, access control lists, internet gateways, virtual gateways, and other channels that allow access. For the thirteenth rule, the recommendations for corrective action may include editing an access control configuration to restrict access (if intranet port access from the internet is not needed).

In one embodiment, a fourteenth rule may analyze an instance without an agent to determine whether the instance allows access to all other ports (e.g., ports not covered in rules eight through thirteen) from somewhere outside trusted locations. The severity of this finding is low. This finding may be reported along with the port number, the TCP or UDP association of the port, the application that typically uses this port, the address ranges that can reach the port, and any security groups, access control lists, internet gateways, virtual gateways, and other channels that allow access. For the fourteenth rule, the recommendations for corrective action may include editing an access control configuration to restrict access (if access from outside the trusted locations is not needed).

In one embodiment, a fifteenth rule may analyze an instance with an agent to determine whether the instance has a connection open on ports that are not accessible from anywhere. The severity of this finding is low and may be considered informational. This finding may be reported along with the list of open ports, the application (and version) associated with each port, and any applicable access control lists and security groups. For the fifteenth rule, the recommendations for corrective action may include terminating the inaccessible service if it is not needed.

In one embodiment, a sixteenth rule may analyze an instance with or without an agent to determine whether all inbound traffic is blocked to the instance. The severity of this finding is low and may be considered informational. This finding may be reported along with any applicable access control lists and security groups. For the sixteenth rule, the recommendations for corrective action may include checking that isolation is appropriate.

Virtual Network Verification Service

In some embodiments, the network configuration analysis may be implemented using a virtual network verification service. In some embodiments, the virtual network verification service leverages a declarative logic programming language to allow the network reachability analyzer to express queries, including recursive queries, about virtual networks on provider networks as constraint problems, and provide results for the queries by resolving the queries using a constraint solver (e.g., a satisfiability modulo theories (SMT) solver) engine. An example declarative logic programming language that may be used in some embodiments is Datalog. Note that other declarative logic programming languages may be used.

Various provider network services may be used by clients to provision and configure networking primitives in their virtual networks; each service may provide its own application programming interfaces (APIs) and networking semantics. Conventionally, while code samples and documentation may be provided for each service, there has been no formal description of the interactions between the networking primitives in virtual networks. In some embodiments, virtual networking semantics and logic for the networking primitives may be expressed and encoded as a set of virtual networking rules according to the logic programming language. The virtual networking rules may include rules that express common relationships and interactions among the various networking primitives that may be implemented in virtual networks and that are provided by the provider network's services and APIs. Thus, embodiments may provide, in one location or file, virtual networking rules that describe the logic of how virtual networking works in the provider network environment.

In some embodiments, the virtual networking rules may incorporate rules that encode networking security standards such as the Payment Card Industry Data Security Standard (PCI DSS), the Federal Risk and Authorization Management Program (FedRAMP) standard, or the Health Insurance Portability and Accountability Act (HIPAA) standard, or a client's internal security standards. In some embodiments, the virtual network verification service may provide two or more different sets of virtual networking rules that each encode different networking security standards that may be selectively used to verify that virtual networks conform to particular standards. In some embodiments, the virtual network verification service may allow a client (such as the network reachability analyzer) to define custom rules that encode the client's internal security standards, best practices, or other networking requirements, and thus sets of virtual networking rules may be implemented that include custom rules defined by the clients for application to their particular virtual networks.

In some embodiments, the virtual network verification service obtains descriptive information for a client's virtual network. The descriptive information may, for example, identify instances of the networking primitives that are implemented in the virtual network, include descriptions of the instances (e.g., roles assigned to computation instances, permissions granted to or denied to resource instances, IP addresses assigned to the instances, etc.), describe relationships among the instances (e.g., paths over the network between instances), and describe interfaces or access points to external entities (e.g., computation instances that can be accessed by entities external to the virtual network). In some embodiments, the client may obtain the descriptive information from the virtual network and provide the descriptive information to the virtual network verification service. Alternatively, in some embodiments, the client may grant permission to the virtual network verification service to allow the virtual network verification service to obtain the descriptive information directly from the virtual network. The virtual network verification service may encode the descriptive information as logic programs according to the declarative logic programming language.

Embodiments of the virtual network verification service may provide significant advantages when compared to conventional network analysis methods such as port scanning and syntactic check methods. Unlike these conventional methods, through the encoded virtual networking rules and virtual network description, the virtual network verification service may have knowledge of all networking primitives and resource instances as well as their complex interrelationships. Unlike conventional methods that rely on devices being up at the time of the scan, and that thus may only identify paths over the network between devices that exist at the time of the scan, the descriptive information may be obtained by the client or by the service using only DESCRIBE calls to APIs of one or more provider network services that maintain metadata describing virtual networks, and thus paths over the network can be identified even if respective devices or instances are not up and listening. Further, port scanning methods may identify the existence of threats, but not the absence of threats. Syntactic check methods may check shallow properties of individual network devices, but do not identify the presence or absence of attack vectors. In some embodiments, the virtual network verification service, on the other hand, may find all possible deviations from network policies as expressed in the encoded virtual networking rules, and may identify both the presence and the absence of threats and attack vectors. In addition, the descriptive information may be obtained by the client or by the service using only DESCRIBE calls to one or more provider network services that maintain metadata describing virtual networks, and thus unlike conventional methods such as port scanning methods that require substantial network and CPU bandwidth there is little or no impact on the client's virtual network, and further complete network access to every device on the provider network is not required as is the case with port scanning methods.

In some embodiments, the virtual network verification service receives queries from the client (such as the network reachability analyzer). In some embodiments, the queries may be posed in an expressive query language that is similar to SQL, but that applies to network configurations. A non-limiting example of such a query may be "VNVS query -i list: can-ssh(A,B)" that requests the virtual network verification service (VNVS) to provide a list of all pairs of instances such that instance A can SSH to instance B. Alternatively, in some embodiments, the queries may be posed in human-friendly ways. A non-limiting example of such a query may be something like "Show me a list of all pairs of instances, such that an instance A can SSH into an instance B." In some embodiments, at least some queries may be pre-defined and provided to a user in user interface elements (e.g., menus) via a graphical interface to the virtual network verification service.

The queries may correspond to theorems about the generated logic programs and express constraint problems. The virtual network verification service may resolve the constraint problems expressed by the queries for the encoded description according to the encoded rules using a constraint solver program (also referred to as a constraint solver engine) configured to resolve constraint problems according to the declarative logic programming language, and provides the results to the client. In some embodiments, the virtual network verification service may provide an API and interface for posing queries. In some embodiments, the virtual network verification service may provide a set of standard queries that the client can select via the API and interface. In some embodiments, the virtual network verification service may allow the client to compose and submit custom queries via the API and interface.

In embodiments, the virtual network verification service may be used by a client (such as the network reachability analyzer), via a graphical interface to the service on a console or via a command line interface (CLI), to obtain answers to questions (posed as queries that specify constraints) about their virtual network on the provider network. Example questions that may be posed as queries include, but are not limited to:

Which instances in the virtual network are accessible from the Internet?

Which instances can access specified resources on the virtual network (e.g., a database, a cache, a storage endpoint, another instance, etc.)?

Does the virtual network conform to best practices of a networking security standard?

Does the virtual network comply with my company's best practices as encoded in this set of rules?

More generally, the virtual network verification service may be used by a client (such as the network reachability analyzer) to verify that expected pipes between resources in the virtual network and other resources in the virtual network, as well as expected pipes to external entities, are open, and that the expected pipes are the only open pipes (e.g., that external entities cannot reach resources in the virtual network which they should not be allowed to reach).

Verifying that a pipe between a resource and other resources in the virtual network or a pipe between a resource in the virtual network and external entities is open may include verifying that there is a path or route over the network (i.e., that there is network connectivity) between the resources or between a resource and the external entities (e.g., a path from the resource to an HTTPS gateway via which external entities may access resources on the virtual network). A path may be a direct path over the network that provides network connectivity between endpoints, or alternatively may be a transitive path that passes through one or more hops on a route and that provides network connectivity between endpoints. Descriptive information for the virtual network may be obtained using only DESCRIBE calls to APIs of one or more provider network services that maintain metadata describing virtual networks, and thus paths may be verified even if respective devices or instances are not up and listening. In some embodiments, the descriptive information for the virtual network may include permissions granted or denied to resources (e.g., a permission granting or denying one resource access to an endpoint on the virtual network, permissions specifying IP address ranges or particular ports of resource instances that can or cannot access a given endpoint (e.g., a storage endpoint), etc.). In these embodiments, verifying that a path in the virtual network is open may include verifying that the required permissions for the path have been granted. Similarly, verifying that expected paths are the only open paths may include determining that resources in the virtual network or external entities do not have permission to access resources that they should not have access to.

Embodiments of the virtual network verification service with appropriate sets of virtual networking rules may, for example, be used by clients (such as the network reachability analyzer) to help the customers verify that their virtual networks comply with networking security standards such as the Payment Card Industry Data Security Standard (PCI DSS), the Federal Risk and Authorization Management Program (FedRAMP) standard, or the Health Insurance Portability and Accountability Act (HIPAA) standard, or to verify that their virtual networks comply with the client's internal security standards or other internal networking requirements.

Another example application for the virtual network verification service is for identifying possible impact in the virtual network of vulnerabilities such as network security issues or software bugs. For example, if a vulnerability is discovered in a particular software program running on a particular instance in the virtual network, the client (such as the network reachability analyzer) may compose and submit queries to determine all the ways that this instance can communicate with other instances in the virtual network. The results may allow the client to identify the possible impact of the vulnerability, and thus to make a decision as to how to best handle the situation. For example, if there is no direct path from the instance with the vulnerability to an instance with a mission-critical database, the problem may be given a lower priority to be handled according to a normal maintenance schedule. If the instance with the vulnerability will impact the instance with the mission-critical database, the decision may be made to shut down at least part of the virtual network to address the vulnerability immediately.

Another example application for the virtual network verification service is in offline testing of changes to virtual networking for the provider network environment. For example, the virtual networking rules that describe the logic of how virtual networking works in the provider network environment can be used in a testing environment to test changes to the virtual networking primitives before the changes are applied to the provider network to determine what effects the changes may have on virtual networks.

Another example application for the virtual network verification service is in automatically synthesizing virtual networks for clients. For example, a client (such as the network reachability analyzer) may want to establish a virtual network that complies with a particular networking security standard and that contains a specified set of networking primitives. The virtual network verification service and virtual networking rules can be used in automatically synthesizing and verifying a virtual network that satisfies all of the constraints (client-specified primitives, networking security standard, virtual networking rules that describe the logic of how virtual networking works in the provider network environment, etc.) so that the client does not have to build and test the virtual network themselves. For example, constraints imposed by the standards can be posed as queries, and the queries can be resolved to determine a virtual network configuration that satisfies the constraints, or alternatively to determine if the configuration of a virtual network conforms to the constraints. A virtual network that conforms to the constraints may then be synthesized, or alternatively a virtual network may be modified to conform to the constraints.

Another example application for the virtual network verification service is in allowing a client (such as the network reachability analyzer) to verify new virtual network configurations or changes to existing virtual networks before the configurations or changes are implemented on the provider network. For example, a virtual network configuration may be generated or modified by the client, and constraints for the configuration can be posed as queries; the queries may be resolved to verify that the configuration conforms to the client's constraints as posed in the queries before the configuration is implemented on the provider network.

Figure 8:
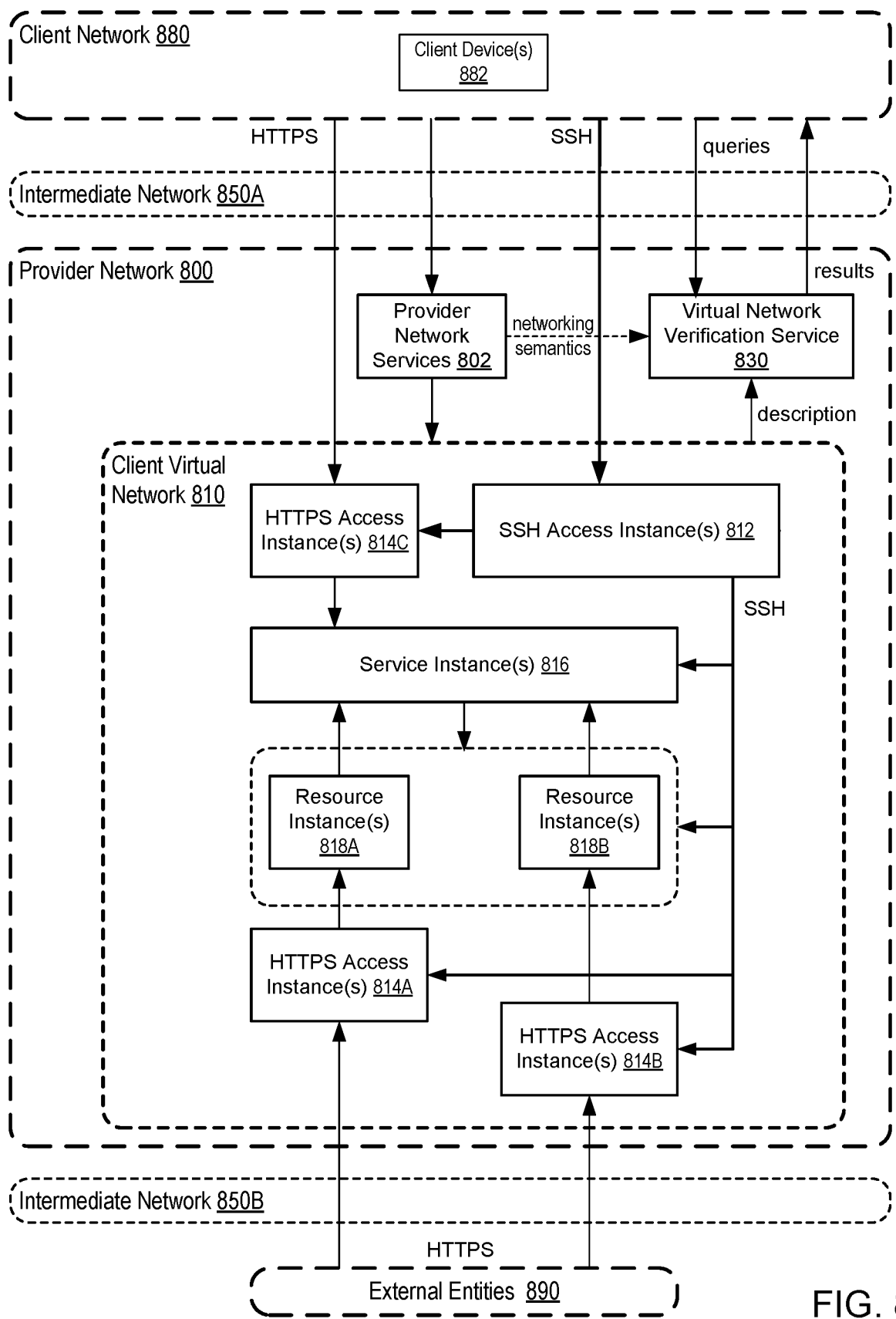
FIG. 8 illustrates a virtual network verification service in a provider network environment, according to some embodiments.

FIG. 8 illustrates a virtual network verification service in a provider network environment, according to some embodiments. A service provider that provides a provider network 800 for clients may provide services and application programming interfaces (APIs) 802 that allow clients to establish and manage resources in virtual networks 810 on the provider network 800. A virtual network 810 in a provider network 800 environment may be broadly defined as a network space (e.g., logically defined by an address range or address space) that contains a set of provider network resources of a respective client, and that acts as a logically isolated section on the provider network 800 for the client's resources. A virtual network 810 may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a virtual network 810 may be assigned IP addresses (e.g., 32-bit IPv4 addresses) within the virtual network 810's address space. A client's virtual network 810 on the provider network 800 includes the client's resource instances, such as virtual machines (VMs) on host devices configured as virtual computing resource instances by the client. At least some of the resource instances on a provider network may be implemented according to hardware virtualization technology that enables multiple operating systems to run concurrently on a host computer, i.e. as VMs on a host device. A hypervisor, or virtual machine monitor (VMM), on the host device presents the VMs on the respective host with a virtual platform and monitors the execution of the VMs on the host device. Each VM may be provided with one or more IP addresses; the VMM on a respective host may be aware of the IP addresses of the VMs on the host.

Various networking resources, structures, and functionalities (referred to as networking primitives) may be provided to clients of the provider network 800 via the various provider network services 802. Clients may create, configure, populate, and modify their virtual networks 810 on the provider network 800 at least in part using the various services and APIs 802. The following lists example networking primitives that may be provided by the services 802, and is not intended to be limiting:

Virtual networks.

Resource instances (e.g., VMs configured as virtual computing resource instances (e.g., application servers, web servers, database servers, access points, gateways, load balancers, instances of particular provider network services such as logging services, network monitoring and analysis services, code repository services, container management services, etc.) by the client using the services 802).

Tags—In some embodiments, a client may be allowed to assign particular roles to particular resource instances (e.g., VMs) within their virtual network(s) by tagging the resource instances. A tag may, for example, be a text string such as PROD or DEV. The tags may be stored in metadata for the resource instances. The tags may include standard provider network-defined tags and/or client-defined tags. Example roles for resource instances include, but are not limited to, Secure Socket Shell (SSH) access instances, logging service instances, code repository instances, production resource instances, and development resource instances.

Virtual network endpoints (e.g., endpoints such as computation resources, storage resources, servers, host devices, etc.).

Virtual network peering connections. In some embodiments, a client may establish two or more virtual networks on a provider network. A peering connection may be established between the virtual networks that allows the virtual networks to securely communicate over the provider network without having to traverse an external network such as the Internet.

Internet gateways that provide access to at least some of a virtual network's resources from entities external to the virtual network.

Load balancers, for example virtualized load balancer instances that distribute network traffic among a group or cluster of resource instances on a virtual network.

Network Address Translation (NAT) instances.

NAT gateways.

Network Access Control Lists (ACLs).

Network interfaces.

Route tables.

Subnets—A virtual network may be, but is not necessarily, subdivided into two or more subnetworks, or subnets.

Security groups—In some embodiments, the provider network may allow a client to establish and manage virtual security groups within the client's virtual network, within or across subnets. A security group is a logical grouping of resource instances and acts as a virtual firewall that controls the traffic allowed to reach one or more resource instances within the security group according to security group rules.

Regions—Provider network services and resources (e.g., virtual networks, VM instances, data storage, gateways, load balancers, etc.) may be supported in multiple geographic locations or areas. As used herein, a region is a separate geographic area that supports the provider network services and in which a client may launch and configure resources. The services and APIs may allow clients to launch or replicate their resources in one or more regions.

Zones—Each region may include multiple, isolated locations, referred to herein as zones. A client's resource instances may be distributed across multiple zones within a region so that, if a resource instance in one zone fails, an instance in another zone can handle requests.

In some embodiments, clients may establish virtual networks 810 on the provider network 800 that include instances of one or more of the above networking primitives using respective provider network services 802. FIG. 8 illustrates an example virtual network 810 on a provider network 800, and is not intended to be limiting. A client's virtual network 810 may include resources instances 818 (e.g., VMs) that implement the functionality of the virtual network, for example application servers, web servers, database servers, and so on. The resources instances 818 may include groups or clusters of instances 818A and 818B; for example, instances 818A may represent a production environment, while instances 818B may represent a development environment. In some embodiments, instances 818A and 818B may be in different subnets and/or security groups.

A client's virtual network 810 may also include service instances 816 (e.g., VMs) that implement particular provider network services in the client's virtual network 810 such as application and operating system logging services, network monitoring and analysis services, code repository services, container management services, and so on.

A client's virtual network 810 may also include access instances that enable devices 882 on the client network 880 and other external entities 890 to communicate with resources and endpoints within virtual network 810 via an intermediate network 850 such as the Internet. Access instances may, for example, include load balancers and gateways (Internet gateways, NAT gateways, etc.). As shown in this example, in some embodiments the access instances may include HTTPS access instances 814 and SSH access instances 812. HTTPS access instances 814 may include instances 814A and 814B for accessing resource instances 818A and 818B, respectively, from external entities 890 using the HTTPS protocol, as well as instances 814C for accessing service instances 816 from devices 882 on client network 880 using the HTTPS protocol. In some embodiments, a client may access resource instances in the virtual network 810 from a device 882 (e.g., a console) on the client network 880, for example using SSH. In some embodiments, to access a resource instance using SSH, the client is given an IP address of the instance and a key. The client can then directly SSH into the instance using the provided information. In some embodiments, an SSH access instance 812 may act as a proxy that allows the client to access the client's resource instances on the virtual network 810 from a device 882 (e.g., a console) on the client network 880 using the SSH protocol. For example, an SSH access instance 812 may be in a publicly accessible subnet of the client's virtual network. At least some of the client's resource instances may be in a subnet that is not publicly accessible. These resource instances may be in a security group that allows SSH access from a security group attached to the SSH access instance 812. The client may connect to the SSH access instance 112 to connect to the client's resource instances.

As shown in FIG. 8, the provider network 800 may include a virtual network verification service 830 implemented by one or more computing devices on the provider network 800. In some embodiments, an instance of virtual network verification service 830 may be implemented on the client's virtual network 800, for example by an SSH access instance 812 as illustrated in FIG. 8. The virtual network verification service 830 may leverage a declarative logic programming language (e.g., Datalog) to allow the client to express queries, including recursive queries, about their virtual networks on provider networks as constraint problems, and that provides results for the queries by resolving the queries using a constraint solver engine.

In the virtual network verification service 830, virtual networking semantics and logic for networking primitives provided by services 802 may be expressed and encoded as a set of virtual networking rules according to the logic programming language. The virtual networking rules may include rules that express common relationships and interactions among the various networking primitives that are implemented in virtual network 810. The virtual networking rules may also incorporate rules that encode networking security standards (e.g., PCI, FedRAMP, HIPAA, etc.), or a client's internal security standards or other networking requirements.

The virtual network verification service 830 obtains descriptive information for the client's virtual network 810. The descriptive information may, for example, identify instances of the networking primitives that are implemented in the virtual network 810, include descriptions of the various instances (e.g., roles assigned to instances, permissions granted to or denied to instances, IP addresses assigned to the instances, etc.), describe relationships among the instances (e.g., paths between instances), and describe interfaces or access points to external entities 890. In some embodiments, the client may obtain the descriptive information from the virtual network 810 and provide the descriptive information to the virtual network verification service 830. Alternatively, in some embodiments, the client may grant permission to the virtual network verification service 830 to allow the virtual network verification service 830 to obtain the descriptive information directly from the virtual network 810. The virtual network verification service 830 may encode the descriptive information as logic programs according to the declarative logic programming language.

The virtual network verification service 830 may leverage a declarative logic programming language and allow clients to pose queries about their virtual networks 810 on the provider network 800, for example via a graphical interface or a command line interface (CLI) to the service 830 on a client device 882 in the client network 880. An example logic programming language that may be used in some embodiments is Datalog. Note that other declarative logic programming languages may be used. In some embodiments, the queries may be posed in an expressive query language that may be somewhat similar to SQL, but that applies to network configurations. Alternatively, in some embodiments, the queries may be posed in human-friendly ways. The queries correspond to theorems about the generated logic programs and express constraint problems. The virtual network verification service 830 may resolve the constraint problems expressed by the queries for the encoded description according to the encoded rules using the constraint solver engine and provides the results to the client. In some embodiments, the virtual network verification service 830 may provide an API and interface for posing queries. In some embodiments, the virtual network verification service 830 may provide a set of standard queries that the client can select via the API and interface. In some embodiments, the virtual network verification service 830 may allow the client to compose and submit custom queries via the API and interface.

The following describes example queries that may be posed by the client about the example virtual network shown in FIG. 8, and is not intended to be limiting.

In some embodiments of a virtual network 810, resources on the virtual network 810 should only be accessible via SSH through SSH access instance(s) 812 from designated endpoints on client network 880. Thus, the client may want to verify that no instances in virtual network 810 are accessible via SSH from endpoints on the intermediate network 850. An example query to verify this may be expressed as:

```
all Instance:
  !internet-can-ssh-to-instance(Instance).
```

The client may also want to verify that, from the client network 880, the SSH access instance(s) 812 on the virtual network 810 are accessible via SSH. As previously noted, in some embodiments, at least some of a client's instances in the virtual network 810 may be assigned particular roles; the roles may be indicated by tags stored in metadata for the instances. The tags may be included in the descriptive information, and thus may be indicated in the encoded description for the virtual network 810. Thus, in some embodiments tags may be used in queries, for example to verify that instances that are assigned particular roles can actually perform those roles. An example query to verify that, from the client network 880, the SSH access instance(s) 812 on the virtual network 810 are accessible via SSH may be expressed as:

```
all Instance:
  atom/instance-tag(Instance, tag-key/Name, tag-value/
  SSHAccessInstance)
  <=> ClientNetwork-can-ssh-to-instance(Instance).
```

The above expression, when evaluated by the constraint solver, checks all instances on the virtual network 810; for instances that are tagged as SSHAccessInstance, the constraint solver determines if the instance is reachable via SSH from the client network 880, returning TRUE if so and FALSE if not.

The following lists some other examples of aspects of the virtual network 810 that a client may verify by posing appropriate queries to the virtual network verification service 830, and is not intended to be limiting:

Only the SSH access instance(s) 812 are accessible via SSH from the client network 880.

Resource instances 818A and 818B are reachable through their respective HTTPS access instances 814A and 814B by external entities 890 via intermediate network 850B (e.g., the Internet).

Resource instances 818A and 818B can reach intermediate network 850B to authenticate requests.

Resource instances 818A and 818B can write to specified service instances 816.

Specified service instances 816 can be reached from the client network 880 through HTTPS access instance(s) 814C.

Specified service instance 816 can reach specified endpoints on the virtual network 810.

All instances are tagged with one of a set of specified tags.

Figure 9:
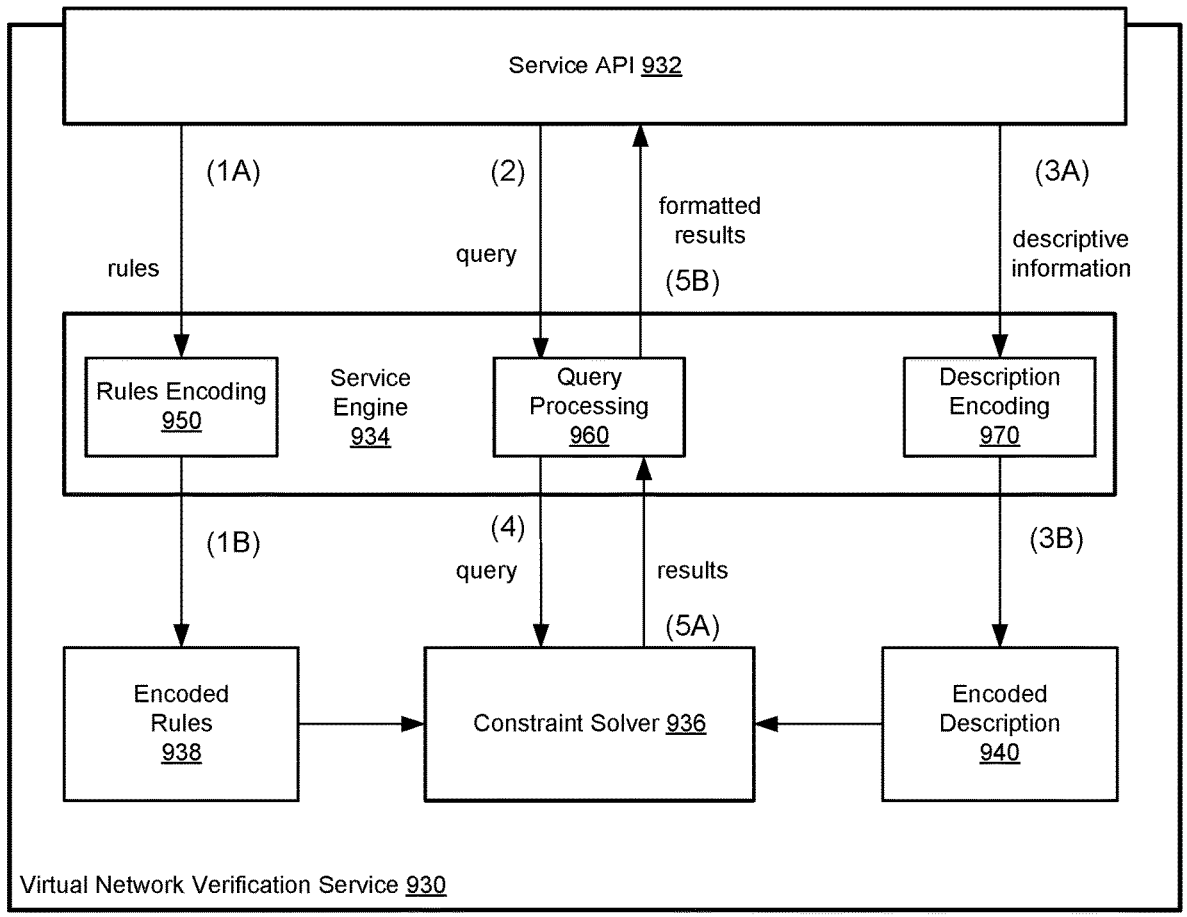
FIG. 9 illustrates components and operation of an example virtual network verification service, according to some embodiments.

FIG. 9 illustrates components and operation of an example virtual network verification service, according to some embodiments. Virtual network verification service 930 may be implemented by one or more computing devices on a provider network. In some embodiments, an instance of virtual network verification service 930 may be implemented on the client's virtual network, for example by an SSH access instance 812 as illustrated in FIG. 8. As shown in FIG. 9, in some embodiments, the virtual network verification service 930 may include a service engine 934, a constraint solver 936 engine, and an API 932. Service engine 934 may implement, but is not limited to, rules encoding 950 logic, query processing 960 logic, and description encoding 970 logic. Constraint solver 936 may represent a declarative logic programming language engine configured to resolve queries, including recursive queries, about the virtual network as represented by the encoded description 940 based on encoded virtual networking rules 938. API 932 exposes functionality of the service 910 to external entities including but not limited to the client.

At (1A) and (1B) of FIG. 9, rules encoding 950 logic of the service 930 may obtain (1A) and encode (1B) virtual networking rules 938 to be applied to the virtual network. Rules to be encoded may be obtained from the service provider, from the client, or from other external entities or sources. Example encoded rules 938 are provided later in this document.

In embodiments, virtual networking semantics and logic for the networking primitives used in virtual networks may be obtained and encoded as a set of virtual networking rules 938 according to the logic programming language. The virtual networking rules 938 may include rules that express common relationships and interactions among the various networking primitives that may be implemented in virtual networks and that are provided by the provider network's services and APIs. Thus, embodiments may provide, in one location or file, virtual networking rules 938 that describe the logic of how virtual networking works in the provider network environment.

In some embodiments, the virtual network verification service 930 may obtain and encode rules for networking security standards such as the Payment Card Industry Data Security Standard (PCI DSS), the Federal Risk and Authorization Management Program (FedRAMP) standard, or the Health Insurance Portability and Accountability Act (HIPAA) standard, and thus sets of virtual networking rules 938 may be implemented that include rules for verifying networking security standards. In some embodiments, the virtual network verification service 930 may provide two or more different sets of virtual networking rules 938 that each encode different networking security standards that may be selectively used by clients to verify that their virtual networks conform to particular standards. In some embodiments, the virtual network verification service 930 may allow a client to define custom rules that encode the client's internal security standards, best practices, or other networking requirements, and thus sets of virtual networking rules 938 may be implemented that include custom rules defined by the clients for application to their particular virtual network.

At (2) of FIG. 9, query processing 960 logic of the service 930 may receive a query from the client to be resolved for the virtual network according to the virtual networking rules 938. In some embodiments, the client may provide the query about their virtual network on the provider network via a graphical interface or a command line interface (CLI) to the service API 932. In some embodiments, the query may be posed in an expressive language that is similar to SQL, but that applies to network configurations. Alternatively, in some embodiments, the queries may be posed in human-friendly ways. Example queries are described above in reference to FIG. 8.

At (3A) and (3B) of FIG. 9, description encoding 970 logic of the service 930 may obtain (3A) and encode (3B) a description of the virtual network. In some embodiments, description encoding 970 logic of the service 930 obtains descriptive information (3A) for the virtual network and encodes (3B) the descriptive information as an encoded description 940 for each query it receives to insure that the description 940 is up-to-date when resolving the query. However, in some embodiments, description encoding 970 logic may obtain and encode descriptive information for the virtual network, and process two or more queries using the encoded description 940. At (3A) of FIG. 9, description encoding 970 logic of the service 930 obtains descriptive information for the client's virtual network. The descriptive information may, for example, identify instances of the networking primitives that are implemented in the virtual network, include descriptions of the various instances (e.g., roles assigned to instances, permissions granted or denied to instances, IP addresses assigned to the instances, etc.), describe relationships among the instances (e.g., paths between instances), and describe interfaces or access points to external entities. In some embodiments, the client may obtain the descriptive information from the virtual network and provide the descriptive information to the virtual network verification service 930 with the query. Alternatively, in some embodiments, the client may grant permission to the virtual network verification service 930 to allow the virtual network verification service 230 to obtain the descriptive information directly from the virtual network in response to the query. At (3B) of FIG. 9, description encoding 970 logic of the service 930 may encode the obtained descriptive information as logic programs according to the declarative logic programming language.

At (4) of FIG. 9, query processing 960 logic of the service 930 may provide the query to the constraint solver 936. The constraint solver 936 resolves the constraint problem expressed by the query for the encoded description 940 according to the encoded rules 938, and at (5A) provides results (e.g., answers to the question posed by the query) to query processing 960 which formats the results and provides the formatted results to the client via the API 932 at (5B). The formatted results may include textual results (e.g., text that expresses an answer to a constraint posed by the query such as "YES", "NO", "TRUE", or "FALSE", a list of instances that meet a constraint posed by the query, etc.) and/or graphical results (e.g., a graphical representation of a relationship among two or more instances that was determined by resolving the query, a graphical representation of the virtual network identifying instances that were identified by resolving the query, etc.).

Figure 10:
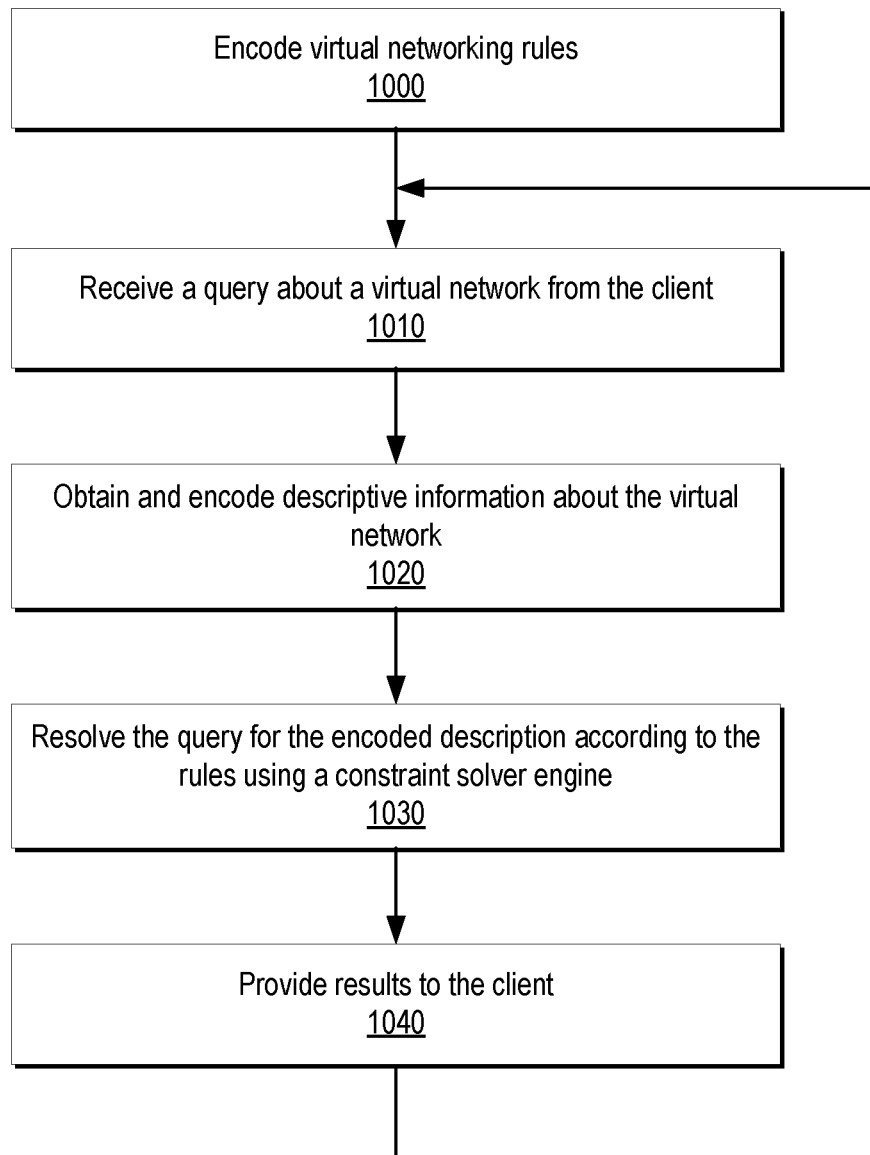
FIG. 10 is a flowchart of a method for providing information about a virtual network to clients of a provider network, according to some embodiments.

FIG. 10 is a flowchart of a method for providing information about a virtual network to clients of a provider network, according to some embodiments. As indicated at 1000, virtual networking rules may be obtained and encoded. Rules to be encoded may be obtained from the service provider, from the client, or from other external entities or sources. The virtual networking rules may express virtual networking semantics and logic for the networking primitives used in virtual networks on the provider network. In some embodiments, the virtual networking rules may express rules for networking security standards such as the Payment Card Industry Data Security Standard (PCI DSS), the Federal Risk and Authorization Management Program (FedRAMP) standard, or the Health Insurance Portability and Accountability Act (HIPAA). In some embodiments, the virtual networking rules may include client-defined rules that express the client's internal security standards or other networking requirements. Example encoded rules are provided later in this document.

As indicated at 1010, the virtual network verification service may receive a query about a virtual network from the client (such as the network reachability analyzer). In embodiments, the virtual network verification service may be used by a client, via a graphical interface to the service on a console or via a command line interface (CLI), to obtain answers to questions (posed as queries, including recursive queries) about their virtual network on the provider network. In some embodiments, a query may be posed in an expressive language that is similar to SQL, but that applies to network configurations. Alternatively, in some embodiments, the queries may be posed in human-friendly ways. Example queries are described above in reference to FIG. 8.

As indicated at 1020, the virtual network verification service may obtain and encode descriptive information about the virtual network. The descriptive information may, for example, identify instances of the networking primitives that are implemented in the virtual network, include descriptions of the instances (e.g., roles assigned to computation instances, permissions granted to or denied to resource instances, IP addresses assigned to the instances, etc.), describe relationships among the instances (e.g., paths between instances), and describe interfaces or access points to external entities (e.g., computation instances that can be accessed by entities external to the virtual network). In some embodiments, the client may obtain the descriptive information from the virtual network and provide the descriptive information to the virtual network verification service. Alternatively, in some embodiments, the client may grant permission to the virtual network verification service to allow the virtual network verification service to obtain the descriptive information directly from the virtual network. The virtual network verification service may encode the descriptive information as logic programs according to a declarative logic programming language (e.g., Datalog).

As indicated at 1030, the virtual network verification service may resolve the query for the encoded description according to the encoded virtual networking rules using a declarative logic programming language (e.g., Datalog) constraint solver engine. As indicated at 1040, results of the query resolution (e.g., answers to the question posed by the query) may be formatted and provided to the client. The formatted results may include textual results (e.g., text that expresses an answer to a constraint posed by the query such as "YES", "NO", "TRUE", or "FALSE", a list of instances that meet a constraint posed by the query, etc.) and/or graphical results (e.g., a graphical representation of a relationship among two or more instances that was determined by resolving the query, a graphical representation of the virtual network identifying instances that were identified by resolving the query, etc.).

As indicated by the arrow returning from element 1040 to element 1010, elements 1010-1040 may be iteratively performed to pose and resolve multiple queries about the client's virtual network. In some embodiments, for example, the client may write a script that includes a series of queries, and run the script to pose the queries to and receive results from the virtual network verification service. As shown in FIG. 10, in some embodiments, the virtual network verification service may obtain descriptive information for the virtual network and encode the descriptive information as an encoded description for each query it receives to insure that the description is up-to-date when resolving the query. However, in some embodiments, the virtual network verification service may obtain and encode descriptive information for the virtual network, and process two or more queries using the encoded description.

Figure 11:
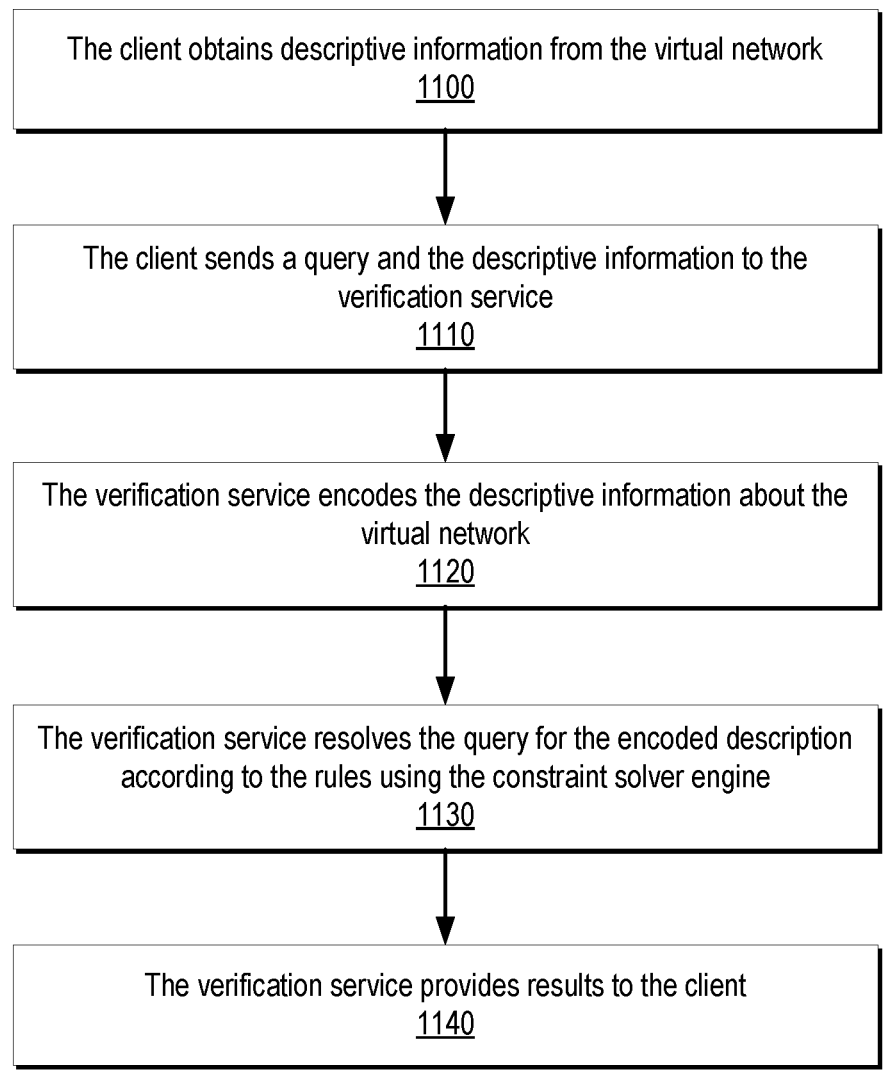
FIG. 11 is a flowchart of a method for providing information about a virtual network to clients of a provider network in which the client provides descriptive information and queries to a virtual network verification service, according to some embodiments.

FIG. 11 is a flowchart of a method for providing information about a virtual network to clients of a provider network in which the client provides descriptive information and queries to a virtual network verification service, according to some embodiments. As indicated at 1100, a client (such as the network reachability analyzer) obtains descriptive information from the virtual network, for example using DESCRIBE calls provided by provider network service APIs. As indicated at 1110, the client sends a query and the descriptive information to the virtual network verification service. As indicated at 1120, the verification service encodes the descriptive information about the virtual network. As indicated at 1130, the verification service resolves the query for the encoded description according to the encoded virtual network rules using the constraint solver engine. As indicated at 1140, the virtual network verification service provides results of the query resolution to the client.

Figure 12:
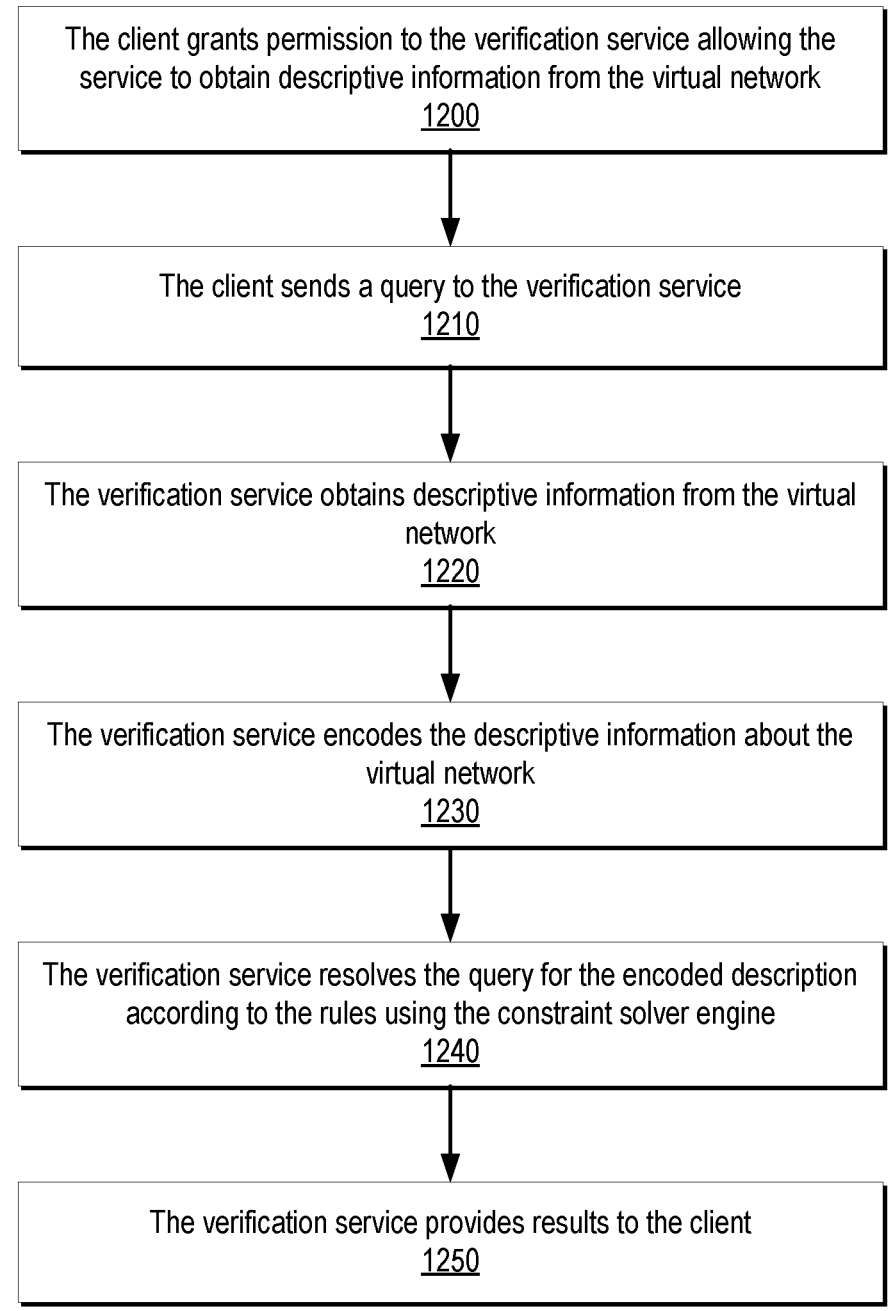
FIG. 12 is a flowchart of a method for providing information about a virtual network to clients of a provider network in which the client provides descriptive information and permissions to access a virtual network to a virtual network verification service, according to some embodiments.

FIG. 12 is a flowchart of a method for providing information about a virtual network to clients of a provider network in which the client provides descriptive information and permissions to access a virtual network to a virtual network verification service, according to some embodiments. As indicated at 1200, a client (such as the network reachability analyzer) grants permission to the virtual network verification service allowing the service to obtain descriptive information from the virtual network, for example permission to use DESCRIBE calls to one or more provider network services that maintain metadata describing virtual networks to obtain information for the virtual network. As indicated at 1210, the client sends a query to the virtual network verification service. As indicated at 1220, the virtual network verification service obtains descriptive information from the virtual network, for example using DESCRIBE calls to one or more provider network services that maintain metadata describing virtual networks. As indicated at 1230, the virtual network verification service encodes the descriptive information about the virtual network. As indicated at 1240, the virtual network verification service resolves the query for the encoded description according to the rules using the constraint solver engine. As indicated at 1250, the virtual network verification service provides results of the query resolution to the client.

Figure 13:
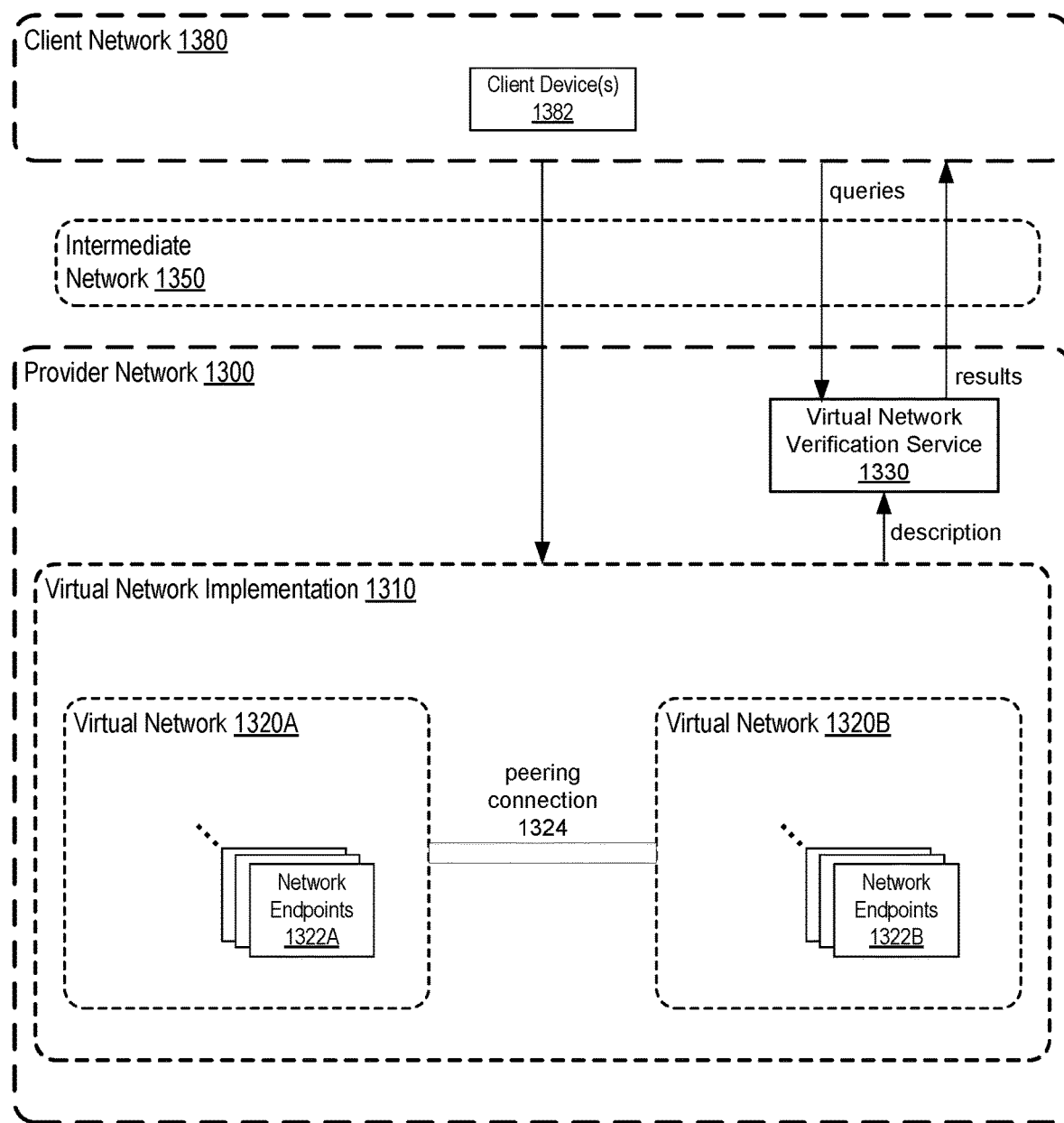
FIG. 13 illustrates a client's virtual network implementation in a provider network environment that includes two or more peered virtual networks, according to some embodiments.

FIG. 13 illustrates a client's virtual network implementation in a provider network environment that includes two or more peered virtual networks, according to some embodiments. FIG. 13 is provided in part to describe example virtual networking rules that may be used in a virtual network verification service 1330 as described herein. As shown in FIG. 13, a client's virtual network implementation 1310 on a provider network 1300 may include two or more virtual networks 1320. FIG. 13 shows two virtual networks 1320A and 1320B in a client's virtual network implementation 1310. In some embodiments, virtual networks 1320A and 1320B may each include one or more subnets, and security groups may be established in virtual networks 1320A and 1320B. Network endpoints 1322A and 1322B represent network interfaces of the various instances of networking primitives (e.g., resource instances) in respective virtual networks 1320A and 1320B. A peering connection 1324 may be established over provider network 1300 between virtual networks 1320A and 1320B that allows instances on the virtual networks 1320A and 1320B to securely communicate over the provider network 1300 without having to traverse an external network 1350 such as the Internet.

Example rules for "private routing" are given below. These example are not intended to be limiting. "Routing" as used in these examples means, in the absence of firewalls, whether IP packets can flow from one endpoint to another endpoint. Routing between two endpoints within the virtual network implementation 1310 may be referred to as "private routing." The rules may be different depending on whether both endpoints are in the same virtual network 1320 or in different virtual networks 1320 in the virtual network implementation 1310. The following describes example rules according to a descriptive logic programming language for determining if packets can flow between two endpoints in a virtual network implementation 1310:

```
routable-private: endpoint -> endpoint -> type
 - : routable-private Endpoint1 Endpoint2
     <- routable-private-one-way Endpoint1 Endpoint2
     <- routable-private-one-way Endpoint2 Endpoint1
```

The first line defines the type for endpoints. Endpoint1 and Endpoint2 are variables. The rule (routable-private Endpoint1 Endpoint2) evaluates as true if (routable-private-one-way Endpoint1 Endpoint2) AND (routable-private-one-way Endpoint2 Endpoint1) are both true (and false otherwise). For routing between endpoints within a virtual network 1320, the rule routable-private-one-way may be defined as:

```
routable-private-one-way: endpoint -> endpoint -> type
 - : routable-private-one-way Endpoint1 Endpoint2
     <- endpoint-has-virtual-network Endpoint1 Vnetwork
     <- endpoint-has-virtual-network Endpoint2 Vnetwork
```

Endpoint1 and Endpoint2 are variables. Vnetwork is the same variable (i.e., indicates the same virtual network 1320). This rule evaluates as true if both Endpoint1 and Endpoint2 are in the same virtual network 1320 (and false otherwise).

For routing between endpoints in different virtual networks 1320 through a peering connection 1324, the rule routable-private-one-way may be defined as follows. The text preceded by "//" are comments:

```
-: routable-private-one-way Endpoint1 Endpoint2
   // look up the IPs of the endpoints
      <- endpoint-has-private-ip Endpoint1 Ip1
      <- endpoint-has- private-ip Endpoint1 Ip2
   // look up the virtual networks of the endpoints
      <- endpoint-has-virtual-network Endpoint1 Vnetwork1
```

```
<- endpoint-has-virtual-network Endpoint2 Vnetwork2
// look up the CIDRs (classless inter-domain routing) of the peering
<- peered-cidrs Pcx Vnetwork1 Cidr1 Vnetwork2 Cidr2
// look up the source endpoint's route table
<- endpoint-has-rtb Endpoint1 Rtb1
// look up the CIDR of the route in the table, and verify the route is
active
<- atom/pcx-route Rtb1 Pcx Cidr3 route-state/active
// make sure all three CIDRs match respective IPs
<- cidr-matches-private-ip Cidr1 Ip1
<- cidr-matches-private-ip Cidr2 Ip2
<- cidr-matches-private-ip Cidr3 Ip2
```

Figure 14:
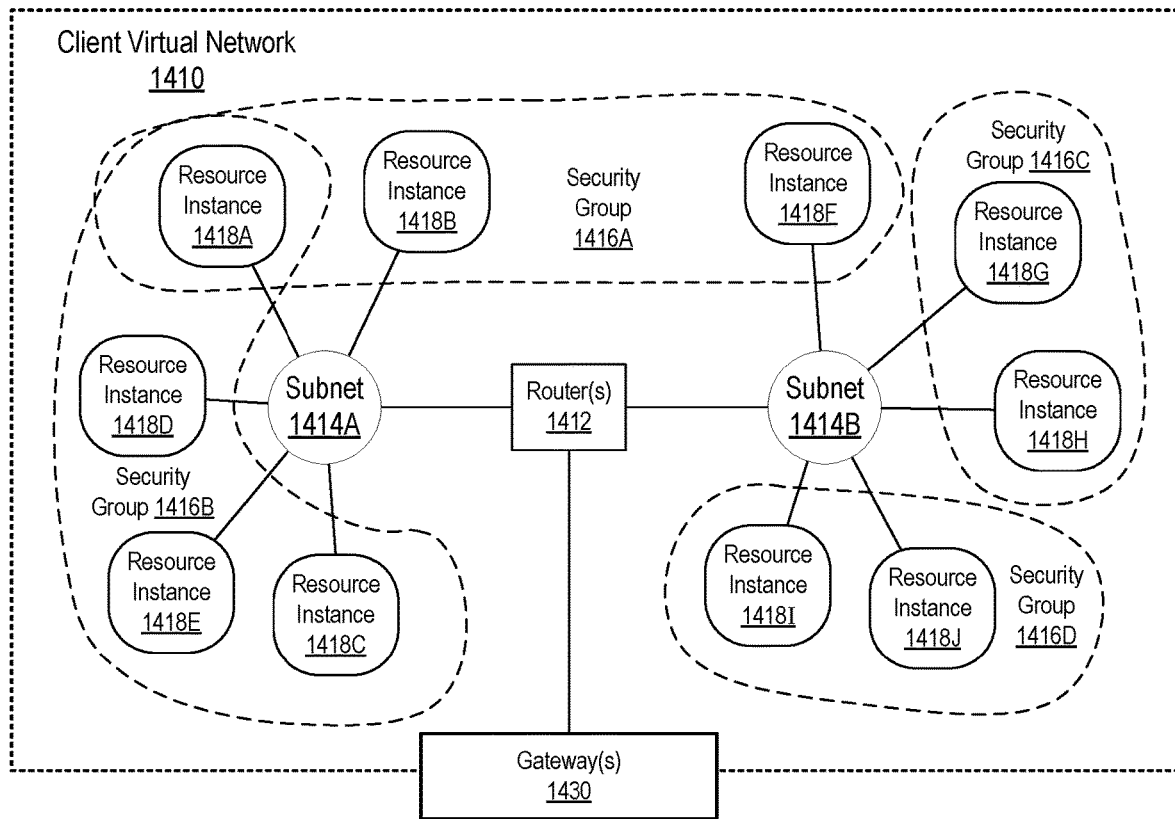
FIG. 14 illustrates subnets and security groups in an example virtual network on a provider network, according to some embodiments.

FIG. 14 illustrates subnets and security groups in an example virtual network on a provider network, according to some embodiments. As discussed above, the network reachability analyzer may recommend and/or perform corrective actions to close ports and/or make ports unreachable, including making changes to security groups. In some embodiments, a provider network may allow the client to establish and manage virtual security groups 1416 within the client's virtual network 1410, within or across subnets 1414. In one embodiment, a security group 1416 is a logical grouping of resource instances 1418 and acts as a virtual firewall that controls the traffic allowed to reach one or more resource instances 1418 within the security group 1416 according to security group rules. The client may establish one or more security groups 1416 within the virtual network 1410, and may associate each resource instance 1418 in the virtual network 1410 with one or more of the security groups 1416. In some embodiments, the client may establish and/or modify rules for each security group 1416 that control the inbound traffic allowed to reach the resource instances 1418 associated with the security group 1416.

In the example virtual network 1410 shown in FIG. 14, the virtual network 1410 is subdivided into two subnets 1414A and 1414B. Access to the virtual network 1410 is controlled by gateway(s) 1430. Each subnet 1414 may include at least one router 1412 that acts to route traffic to (and from) resource instances 1418 on the respective subnet 1414. In some embodiments, network access control lists (ACLs) may be used to control access to the subnets 1414 at router(s) 1412. In the example shown in FIG. 14, resource instances 1418A through 1418E are on subnet 1414A, and resource instances 1418F through 1418J are on subnet 1414B. The client has established four security groups 1416A through 1416D. As shown in FIG. 14, a security group may extend across subnets 1414, as does security group 1416A that includes resource instances 1418A and 1418B on subnet 1414A and resource instance 1418F on subnet 1414B. In addition, a resource instance 1418 may be included in two or more security groups 1416, as is resource instance 1418A which is included in security group 1416A and 1416B.

Illustrative Computer System

In at least some embodiments, a computer system that implements a portion or all of one or more of the technologies described herein may include a computer system that includes or is configured to access one or more computer-readable media. FIG. 15 illustrates such a computing device 1500. In the illustrated embodiment, computing device 1500 includes one or more processors 1510A-1510N coupled to a system memory 1520 via an input/output (I/O) interface 1530. Computing device 1500 further includes a network interface 1540 coupled to I/O interface 1530.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1526. In the illustrated embodiment, system memory 1520 also stores program code and data that implement aspects of the network security evaluator 100 discussed above.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processors 1510A-1510N). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods and apparatus. For example, system memory 1520 may store program code and data associated with the network security evaluator 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement an infrastructure provider network, configured to:
create a virtual network for a client, wherein the virtual network includes virtual machines hosted on physical hosts of the infrastructure provider network;
install agents on the physical hosts, wherein the agents are configured to collect data about individual ones of the virtual machines;
determine, based at least in part on the collected data and on network configuration data for the virtual network, an open port on one of the virtual machines and whether the open port is reachable from outside a trusted location, wherein said determine is performed without sending packets to the open port from outside the trusted location; and
generate a report that identifies the virtual machine, a port number of the open port, and whether the open port is reachable from outside the trusted location.

2. The system as recited in claim 1, wherein the infrastructure provider network is a multi-tenant provider network that hosts a plurality of private networks for a plurality of clients.

3. The system as recited in claim 1, wherein the determination of the open port is performed by a network security evaluator that executes in the infrastructure provider network, wherein the network security evaluator is configured to control the agents.

4. The system as recited in claim 3, wherein the network security evaluator is configured to determine a reachability of the open port from Internet and indicate the reachability in the report.

5. The system as recited in claim 3, wherein the network security evaluator is configured to determine a process listening on the open port based at least in part on the collected data.

6. The system as recited in claim 3, wherein the network security evaluator is configured to determine a network protocol associated with the open port and indicate the network protocol on the report.

7. The system as recited in claim 3, wherein the network security evaluator is configured to determine that the port number is atypical for a network protocol associated with the open port.

8. The system as recited in claim 3, wherein the network security evaluator is configured to monitor for connections to the open port and determine whether the connection represents a security threat.

9. The system as recited in claim 3, wherein the network security evaluator is configured to determine open ports in the virtual network without sending packets to individual ones of the virtual machines from outside the trusted location.

10. The system as recited in claim 3, wherein the network security evaluator is configured to determine one or more corrective actions regarding the open port and recommend the one or more corrective actions in the report.

11. The system as recited in claim 10, wherein the one or more corrective actions includes stopping an application associated with the open port, changing an access control list (ACL) associated with the virtual network, or changing a security group associated with the virtual network.

12. The system as recited in claim 3, wherein the network security evaluator is configured to display the report via a graphical user interface (GUI).

13. The system as recited in claim 12, wherein the network security evaluator is configured to service user queries regarding network configuration of the virtual network via the GUI.

14. A method, comprising:
  performing, by one or more computing devices of an infrastructure provider network:
    creating a virtual network for a client, wherein the virtual network includes virtual machines hosted on physical hosts of the infrastructure provider network;
    installing agents on the physical hosts, wherein the agents are configured to collect data about individual ones of the virtual machines;
    determining, based at least in part on the collected data and on network configuration data for the virtual network, an open port on one of the virtual machines and whether the open port is reachable from outside a trusted location, wherein said determining is performed without sending packets to the open port from outside the trusted location; and
    generating a report that identifies the virtual machine, a port number of the open port, and whether the open port is reachable from outside the trusted location.

15. The method as recited in claim 14, wherein the determination of the open port is performed by a network security evaluator that executes in the infrastructure provider network, wherein the network security evaluator is configured to receive the data collected by the agents.

16. The method as recited in claim 15, further comprising the network security evaluator determining a reachability of the open port from Internet and indicating the reachability in the report.

17. The method as recited in claim 15, further comprising the network security evaluator determining a severity level of a security threat associated with the open port and indicating the severity level in the report.

18. The method as recited in claim 15, further comprising the network security evaluator determining that the port number is atypical for a network protocol associated with the open port.

19. The method as recited in claim 15, further comprising the network security evaluator repeatedly determining open ports in the virtual network according to a schedule.

20. The method as recited in claim 15, further comprising the network security evaluator determining one or more corrective actions regarding the open port and recommending the one or more corrective actions in the report.

* * * * *